United States Patent
Nakada et al.

(10) Patent No.: US 7,853,416 B2
(45) Date of Patent: Dec. 14, 2010

(54) FLOW RATE VERIFICATION FAILURE DIAGNOSIS APPARATUS, FLOW RATE VERIFICATION FAILURE DIAGNOSIS SYSTEM, FLOW RATE VERIFICATION FAILURE DIAGNOSIS METHOD, AND CONTROL PROGRAM PRODUCT FOR FLOW RATE VERIFICATION FAILURE DIAGNOSIS

(75) Inventors: Akiko Nakada, Kasugai (JP); Keisuke Kato, Seto (JP); Akihito Sugino, Inuyama (JP); Hiroki Doi, Kasugai (JP)

(73) Assignee: CKD Corporation, Komaki-shi (JP)

( * ) Notice: Subject to any disclaimer, the term of this patent is extended or adjusted under 35 U.S.C. 154(b) by 142 days.

(21) Appl. No.: 12/285,771

(22) Filed: Oct. 14, 2008

(65) Prior Publication Data

US 2009/0112491 A1    Apr. 30, 2009

(30) Foreign Application Priority Data

Oct. 29, 2007    (JP) .............................. 2007-280832

(51) Int. Cl.
*G01F 1/34* (2006.01)
*G01K 13/00* (2006.01)
*G21C 17/00* (2006.01)

(52) U.S. Cl. ......................... 702/47; 700/282; 702/130; 702/183

(58) Field of Classification Search .................... 702/33, 702/47, 130, 183; 73/23.24; 700/282; 141/4
See application file for complete search history.

(56) References Cited

U.S. PATENT DOCUMENTS

| 2005/0005994 A1* | 1/2005 | Sugiyama et al. ............... 141/4 |
| 2009/0326719 A1* | 12/2009 | Nagase et al. ............... 700/282 |

FOREIGN PATENT DOCUMENTS

| JP | A-8-210883 | 8/1996 |
| JP | A-2003-257878 | 9/2003 |
| JP | B2-3596593 | 12/2004 |
| JP | A-2006-71501 | 3/2006 |
| JP | A-2006-184069 | 7/2006 |
| JP | A-2006-212875 | 8/2006 |
| JP | A-2006-337346 | 12/2006 |

(Continued)

OTHER PUBLICATIONS

Japanese Office Action issued in Japanese Patent Application No. 2007-280832 on Dec. 1, 2009 (English-language translation).
Chinese Office Action issued in corresponding Chinese Patent Application No. 200810173857.8 on Mar. 8, 2010 (with English-language translation).

(Continued)

*Primary Examiner*—John H Le
(74) *Attorney, Agent, or Firm*—Oliff & Berridge, PLC

(57) ABSTRACT

A flow rate verification failure diagnosis apparatus is applied to a gas supply pipe system including flow rate control devices and a flow rate verification unit for detecting flow rate abnormality by measuring flow rate of each of the flow rate control devices on the basis of pressure measured by a pressure measurement device. The flow rate verification failure diagnosis apparatus comprises a failure diagnosis device having a mode to diagnose a failure in the pressure measurement device at a time of the flow rate verification unit detecting the flow rate abnormality, thereby the reliability of flow rate verification can be enhanced.

6 Claims, 11 Drawing Sheets

FOREIGN PATENT DOCUMENTS

| | | |
|---|---|---|
| JP | 2007-095042 | 4/2007 |
| WO | WO 2007/026902 A1 | 3/2007 |
| WO | WO 2007/102319 A1 | 9/2007 |

OTHER PUBLICATIONS

Office Action issued in Korean Application No. 10-2008-0105429 on Sep. 6, 2010 (with English translation).

* cited by examiner

FLOW RATE VERIFICATION FAILURE DIAGNOSIS APPARATUS, FLOW RATE VERIFICATION FAILURE DIAGNOSIS SYSTEM, FLOW RATE VERIFICATION FAILURE DIAGNOSIS METHOD, AND CONTROL PROGRAM PRODUCT FOR FLOW RATE VERIFICATION FAILURE DIAGNOSIS

BACKGROUND OF THE INVENTION

1. Field of the Invention

The present invention relates to a flow rate verification failure diagnosis apparatus, a flow rate verification failure diagnosis system, a flow rate verification failure diagnosis method, and a control program product for flow rate verification failure diagnosis.

2. Description of Related Art

In a film deposition device or a dry etching device in a semiconductor manufacturing process, special gas such as silane or phosphine, corrosive gas such as chlorinated gas, combustible gas such as hydrogen gas, or the like are used.

Flow rates of these gases should strictly be controlled.

The reason of this is because the gas flow rate directly affects a quality of the process. Specifically, the gas flow rate greatly affects a film quality in a film deposition process or a quality of a circuit processing in an etching process, whereby a yield of a semiconductor product is determined according to precision of the gas flow rate.

Another reason is that most of these gases are harmful to a human body and environment or have explosiveness. These gases are not allowed to be directly disposed in the atmosphere after they are used, so that a device used in a semiconductor manufacturing process should be provided with detoxifying device in accordance with a type of gas. However, the detoxifying device described above has limited processing capacity in general. Therefore, when the flow rate more than the allowable value flows, it cannot perfectly process the gas, so that the deleterious gas might be flown out in the atmosphere or the detoxifying device might be broken.

Moreover, since these gases, especially high-purity dust-free gas that can be used in a semiconductor manufacturing process, are expensive, and limitation is imposed on some gases for their use due to natural deterioration, they cannot be preserved in a large quantity.

In view of this, a known mass flow controller serving as a flow rate control device has conventionally been mounted in a semiconductor manufacturing process circuit so that a gas flows in an optimum flow rate for every type of gas. The mass flow controller described above changes the set flow rate by changing the applied voltage thus responding to changes in a process recipe.

However, these gases used in the semiconductor manufacturing process, especially the material gas for the film deposition among the so-called process gases, might cause precipitation of solid substances in a gas line due to its characteristics, so that the flow volume might be changed. The mass flow controller is formed with a capillary tube inside in order to supply a fixed flow rate with high precision. Even a small amount of precipitation of the solid substance on this portion could deteriorate the flow precision of the gas to be supplied. Further, since a gas with high corrosivity for an etching processor the like is flown, the corrosion of the mass flow controller cannot be avoided even if a material having a high corrosion resistance such as a stainless material or the like is used. As a result, a secular deterioration could occur, deteriorating the flow precision.

As described above, in the mass flow controller, the relationship between the applied voltage and the actual flow rate changes, so that the actual flow rate might possibly change. Therefore, the mass flow controller needs to be periodically subject to flow rate verification and calibration.

The flow rate verification of the mass flow controller is basically performed by using a film flowmeter. However, this measurement is performed with a part of a pipe removed. After the measurement, the pipe should be assembled in the original state, and a leakage check should be executed. Therefore, the work is very time-consuming.

Accordingly, it is ideal that the flow rate verification can be executed without removing the pipe.

One of methods of performing a flow rate verification in a state where pipes are assembled is disclosed in Japanese Unexamined Patent Application Publication No. 2006-337346. FIG. 11 is a schematic configuration diagram of a conventional flow rate verification system 100.

In the conventional flow rate verification system 100, a gas passage 103 is provided between a first shutoff valve 101 and a second shutoff valve 102, and process gas whose flow rate is adjusted by a mass flow controller 110 is supplied to a process chamber 111. The gas passage 103 is communicated with an inlet of a vacuum pump 104 via a discharge passage 105. In the discharge passage 105, a third shutoff valve 106, a temperature sensor 108, a pressure sensor 107, and a fourth shutoff valve 109 are disposed. The flow rate verification system 100 has a verification controller connected to the devices 106, 107, 108, and 109 for storing compression factor data peculiar to gaseous species and a value of volume of a predetermined space defined by an outlet of the mass flow controller 110 and the second and fourth shutoff valves 102 and 109.

At first measurement time, the flow rate verification system 100 obtains a mass G1 from a pressure P1 measured by the pressure sensor 107, a temperature T1 measured by the temperature sensor 108, a first compression factor Z1 corresponding to the pressure P1 and the temperature T1, and a volume V indicated with a broken line in the diagram. At second measurement time, the flow rate verification system 100 obtains a mass G2 from a pressure P2 measured by the pressure sensor 107, a temperature T2 measured by the temperature sensor 108, a second compression factor Z2 corresponding to the pressure P2 and the temperature T2, and a volume V. The flow rate verification system 100 obtains difference between the mass G1 at the first measurement time and the mass G2 at the second measurement time and verifies the flow rate of the mass flow controller 110 on the basis of the difference.

The above mentioned flow rate verification system 100 performs a flow rate verification using gas actually used for processing and corrects measurement values with factors peculiar to the gaseous species. Thus, the flow rate verification precision is high.

However, the conventional flow rate verification system 100 performs the flow rate verification on the basis of measurement results of the pressure sensor 107 and the temperature sensor 108 disposed in a gas box. Even in a case where it is determined that there is abnormality in the flow rate verification result, cause of the abnormality is not limited to the mass flow controller 110 while the flow rate verification is underway. There are cases that the cause of the abnormality is a failure in the pressure sensor 107 or disturbance (such as a temperature change in the gas box). The conventional flow rate verification system 100 does not have measures for verifying probability of occurrence of abnormality in the flow rate of the mass flow controller while the flow rate verification is underway. Consequently, in the conventional flow rate verification system 100, the pipes and the like have to be taken from the mass flow controller 110, and the mass flow controller 110 has to be taken from the gas box in order to diagnose failure in each of the devices. The failure test cannot be performed under the same conditions as those when the flow rate verification system 100 detects the flow rate abnormality. It cannot therefore discriminate between the case where the flow rate abnormality is caused only by a failure in the mass flow controller 110 while the flow rate verification is underway and the case where the flow rate abnormality is caused by a failure in another device configuring the flow rate verification system 100. Therefore, in the conventional flow rate verification system 100, when the flow rate abnormality is detected, the cause of the flow rate abnormality is not limited to abnormality in the mass flow controller 110 while the flow rate verification is underway. Thus, the reliability of the flow rate verification is low.

SUMMARY OF THE INVENTION

The present invention has been made in view of the above circumstances and has an object to overcome the above problems and to provide a flow rate verification failure diagnosis apparatus, a flow rate verification failure diagnosis system, a flow rate verification failure diagnosis method, and a control program product for flow rate verification diagnosis that can improve the reliability of the flow rate verification.

To achieve the purpose of the invention, there is provided a flow rate verification failure diagnosis apparatus comprising a gas supply pipe system including flow rate control devices and a flow rate verification unit having a pressure measurement device, the flow rate verification unit detecting flow rate abnormality by measuring a flow rate of fluid in each of the flow rate control device on the basis of pressure of the fluid measured by the pressure measurement device. The flow rate verification failure diagnosis apparatus further comprises a failure diagnosis device having a mode to diagnose a failure in the pressure measurement device in a case of the flow rate verification unit detecting the flow rate abnormality.

According to another aspect of the invention, preferably, a flow rate verification failure diagnosis system comprises a gas supply pipe system including flow rate control devices and a flow rate verification unit having a pressure measurement device, the flow rate verification unit detecting flow rate abnormality by measuring a flow rate of fluid in the flow rate control devices on the basis of pressure of the fluid measured by the pressure measurement device. The flow rate verification failure diagnosis system further comprises a flow rate control device failure diagnosis device for determining a failure causing the flow rate abnormality in other devices besides the flow rate control devices when the flow rate verification unit determines a flow rate abnormality in all of the flow rate control devices and a failure causing the flow rate abnormality in a specific one of the flow rate control devices when the flow rate verification unit determines the flow rate abnormality only in the specific flow rate control device.

According to another aspect of the invention, preferably, a flow rate verification failure diagnosis method is adapted to diagnose a failure causing flow rate abnormality when a flow rate verification unit detects the flow rate abnormality, the flow rate verification unit measuring a flow rate of fluid on the basis of pressure measured by a first pressure measurement device. The flow rate verification failure diagnosis method determines a failure causing the flow rate abnormality in a specific one of the flow rate control devices when the flow rate verification unit detects the flow rate abnormality in the specific flow rate control device among the flow rate control devices and a failure causing the flow rate abnormality in other devices besides the flow rate control devices when the flow rate verification unit detects the flow rate abnormality in all of the flow rate control devices.

According to another aspect of the invention, preferably, a flow rate verification failure diagnosis program recorded on a computer readable medium product to be executed in a computer controlling a gas supply pipe system includes flow rate control devices and a flow rate verification unit having a pressure measurement device, the flow rate verification unit measuring flow rate of the flow rate control devices on the basis of pressure measured by the pressure measurement device and performing flow rate verification. The program comprises the step of diagnosing a failure causing the flow rate abnormality when the flow rate abnormality is detected in the gas supply pipe system.

DETAILED DESCRIPTION OF THE PREFERRED EMBODIMENTS

A detailed description of preferred embodiments of a flow rate verification failure diagnosis apparatus, a flow rate verification failure diagnosis system, a flow rate verification failure diagnosis method, and a control program product for flow rate verification failure diagnosis embodying the present invention will now be given referring to the accompanying drawings.

First Embodiment

<General Configuration of Flow Rate Verification Failure Diagnosis Apparatus and Flow Rate Verification Failure Diagnosis System>

Figure 1:
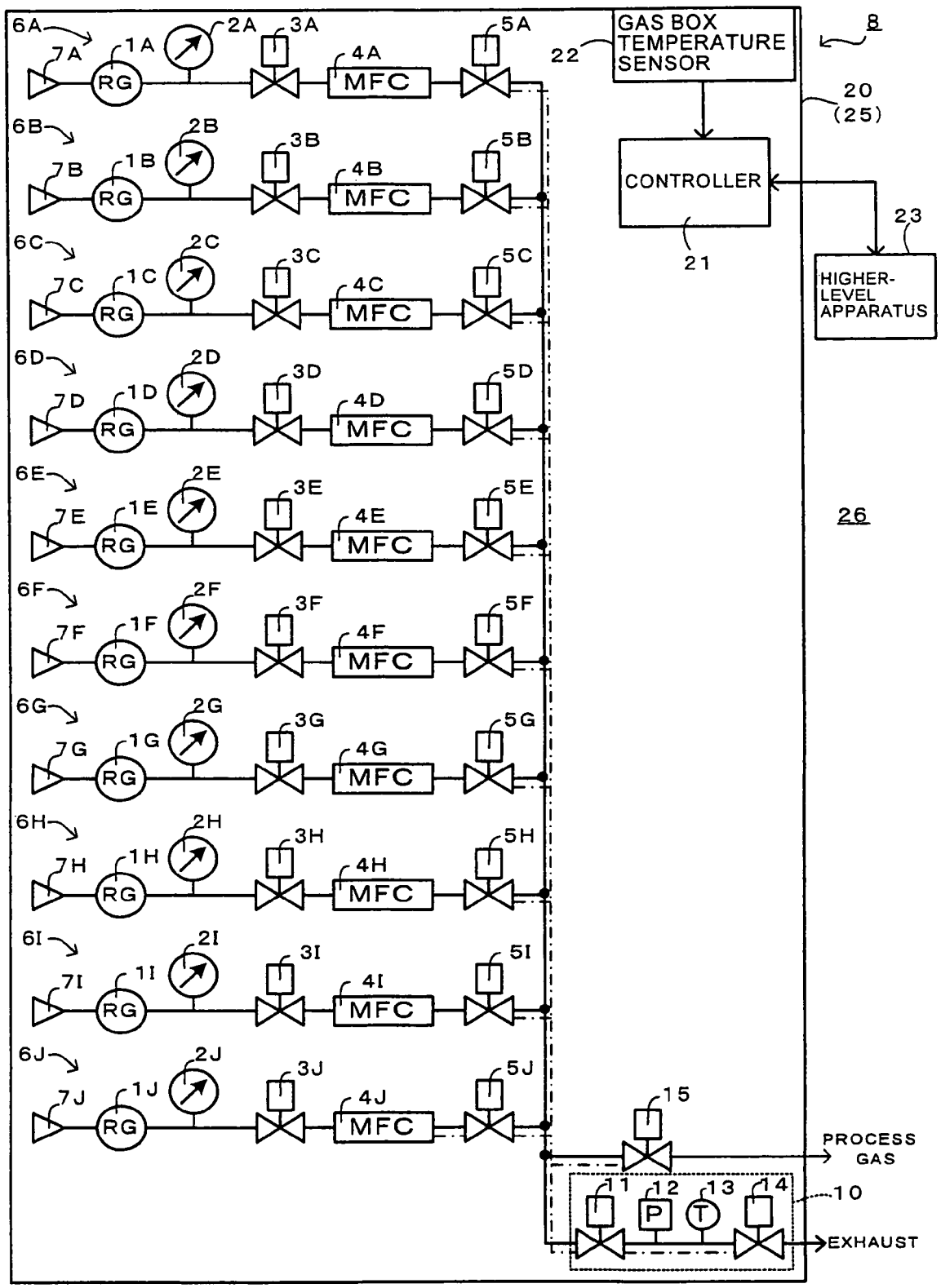
FIG. 1 is a schematic configuration diagram of a flow rate verification failure diagnosis apparatus and a flow rate verification failure diagnosis system in a first embodiment of the present invention.

FIG. 1 is a schematic configuration diagram of a flow rate verification failure diagnosis apparatus 8, a gas supply pipe system 25, and a flow rate verification failure diagnosis system 26.

The flow rate verification failure diagnosis apparatus 8 and the flow rate verification failure diagnosis system 26 are applied to, for example, a gas box 20 shown in FIG. 1. The gas supply pipe system 25 is obtained by installing a plurality of gas units 6A, 6B, 6C, . . . in the gas box 20. Each of the gas units 6A, 6B, 6C, . . . has the same configuration. The subscripts "A", "B", "C", . . . of reference numerals are attached for convenience so that a plurality of gas units, flow devices, flow rate control devices, and the like constructing the gas units are distinguished from each other. In the following, when it is unnecessary to distinguish the components from each other, the subscripts are omitted as appropriate.

The gas units 6A, 6B, 6C, . . . are connected in parallel to a gas supply valve 15 to supply various process gases to a treatment chamber (not shown). A flow rate verification unit 10 is disposed in parallel with the gas supply valve 15. The gas units 6A, 6B, 6C, . . . are connected to a vacuum pump (not shown) via the flow rate verification unit 10 to discharge the process gases.

In the gas box 20, a controller 21 and a gas box temperature sensor 22 are provided. The controller 21 is a controller of the flow rate verification unit 10 and is connected to a higher-level apparatus 23 provided on a semiconductor manufacturing apparatus side. A flow rate verification failure diagnosis program 30 which will be described later is stored in storage media such as a CD-ROM. In the higher-apparatus 23, the flow rate verification failure diagnosis program 30 is installed. The gas box temperature sensor 22 measures temperature in the gas box 20.

<Configuration of Gas Unit>

The gas unit 6 is formed with a regulator 1, a pressure sensor 2, an input open/close valve 3, a mass flow controller 4, and an output open/close valve 5 connected in series. In the gas unit 6, process gas is adjusted to a set pressure by the regulator 1, the flow rate of the process gas is adjusted by the mass flow controller 4, and the process gas is outputted from the output open/close valve 5. The process gas outputted from the output open/close valve 5 is supplied to a not-shown treatment chamber via the gas supply valve 15 or discharged via the flow rate verification unit 10. To each of the gas units 6, process gases of various kinds are supplied.

<Flow Rate Verification Unit>

In the flow rate verification unit 10, a pressure sensor 12 and a temperature sensor 13 are disposed between a first shutoff valve 11 and a second shutoff valve 14.

<Electric Block Configuration of Controller>

Figure 2:
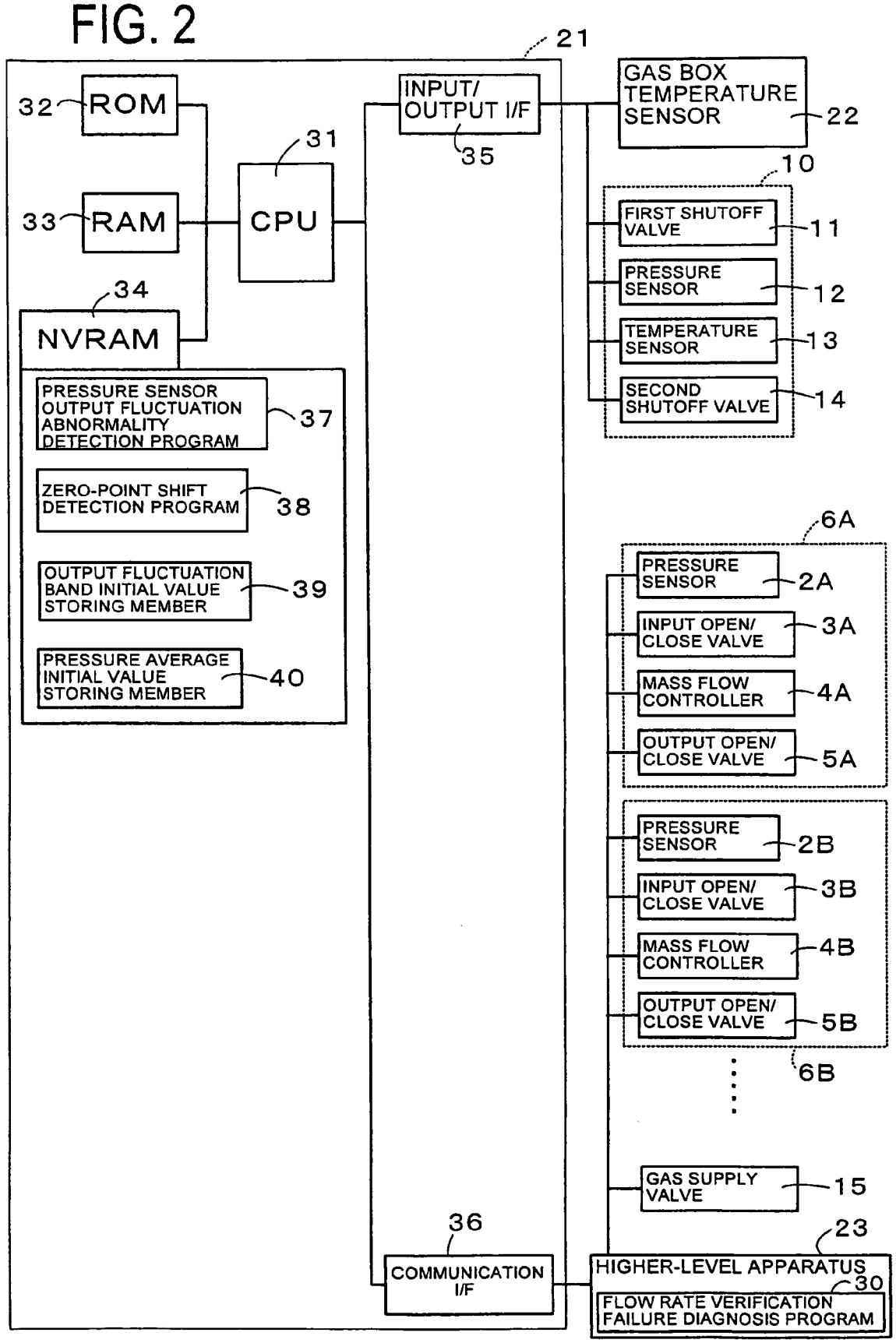
FIG. 2 is an electric block diagram of a controller shown in FIG. 1.

FIG. 2 is an electric block diagram of the controller 21.

The controller 21 is a known computer. The controller 21 has a CPU 31 for processing and calculating data, a ROM (Read Only Memory) 32 for storing a program, a RAM 33 as a readable/writable volatile memory for storing data and a program, an NVRAM 34 as a readable/writable nonvolatile memory for storing data and a program, an input/output interface (hereinbelow, called "input/output I/F") 35 for controlling input/output of signals to/from devices in the gas box 20, and a communication interface (hereinbelow, called "communication I/F") 36 connected to the higher-level apparatus 23 to control transmission/reception of data.

In the NVRAM 34, a pressure sensor output fluctuation abnormality detection program 37 and a zero-point shift detection program 38 are stored. The programs 37 and 38 will be described later.

The NVRAM 34 is also provided with an output fluctuation band initial value storing member 39 for storing an "output fluctuation band initial value" indicative of the difference between the maximum and minimum values of pressures outputted from the normal pressure sensor 12 at the time of a flow rate verification, and a pressure average initial value storing member 40 for storing a "pressure average initial value" indicative of an average value of pressures measured at the time of the flow rate verification by the normal pressure sensor 12. The "output fluctuation band initial value" and the "pressure average initial value" may be theoretical values in designing or actual measurement values obtained by executing a pressure sensor output fluctuation abnormality detecting process (see FIG. 4) and a pressure sensor zero-point shift detecting process (FIG. 5) after attachment of the flow rate verification failure diagnosis apparatus 8 to the semiconductor manufacturing apparatus or completion of assembly of the flow rate verification failure diagnosis apparatus 8.

To the input/output I/F 35, the gas box temperature sensor 22 and the first shutoff valve 11, the pressure sensor 12, the temperature sensor 13, and the second shutoff valve 14 of the flow rate verification unit 10 are connected.

On the other hand, to the higher-level apparatus 23, the pressure sensor 2, the input open/close valve 3, the mass flow controller 4, and the output open/close valve 5 of each of the gas units 6 and the gas supply valve 15 are connected.

<Flow Rate Verification Method>

Next, a flow rate verification method applying the gas supply pipe system 25 and the flow rate verification unit 10 of the first embodiment will be described.

For example, in a case of performing flow rate verification on the gas unit 6J, output open/close valves 5A to 5I of the gas units 6A to 6I and the gas supply valve 15 are closed. On the other hand, an input open/close valve 3J and an output open/close valve 5J of the gas unit 6J, and the first shutoff valve 11 and the second shutoff valve 14 in the flow rate verification unit 10 are opened. In this state, a process gas is supplied from a process gas supply source 7J to a mass flow controller 4J. In order to make the controlled flow rate of the mass flow controller 4J stable, after the process gas is supplied to the gas unit 6J for 30 seconds, the second shutoff valve 14 of the flow rate verification unit 10 is closed.

As a result, the pressure in the flow rate verification unit 10 increases. The pressure sensor 12 measures elapsed time since a pressure P1 (for example, 5 kPa) is detected until a pressure P2 (for example, 13 kPa) is detected. The reason why the time is measured is because the pressure rise time varies according to the flow rate. When the pressure sensor 12 detects 13 kPa, the second shutoff valve 14 is opened to proceed to the next flow rate verification.

The controller 21 receives measurement results from the pressure sensor 12 and the temperature sensor 13 to calculate the flow rate as follows.

A pressure increase amount $\Delta P$ between the first shutoff valve 11 and the second shutoff valve 14 is obtained by subtracting the pressure P1 from the pressure P2. Since the pressure sensor 12 detects pressure at predetermined intervals (for example, 0.1 second intervals), by counting the number of pressure detecting times since the pressure sensor 12 detects the pressure P1 until the pressure sensor 12 detects the pressure P2, measurement time $\Delta t$ in which the pressure between the first shutoff valve 11 and the second shutoff valve 14 rises from P1 to P2 is obtained. By dividing the pressure increase amount $\Delta P$ by the measurement time $\Delta t$, an increase pressure value $\Delta P/\Delta t$ per unit time is obtained. A gas constant R is obtained by using the gas constant as it is of the process gas used. Temperature T is a temperature detected by the temperature sensor 13. Further, a tank volume V is measured in advance before the flow rate verification and stored in the NVRAM 34. By assigning the known numerical values (the increase pressure value $\Delta P/\Delta t$ per unit time, gas constant R, temperature T, and tank volume V) to the following equation 1, a flow rate Q is calculated.

$$\text{Flow rate } Q = \frac{\Delta P}{\Delta t} \times \frac{V}{RT} \qquad \text{Equation 1}$$

The flow rate verification unit 10 compares the calculated flow rate Q with a set flow rate of the mass flow controller 4J. When the calculated flow rate Q and the set flow rate coincide with each other, the flow rate verification unit 10 determines that the mass flow controller 4J properly controls the flow rate (normal). When they do not coincide with each other, the flow rate verification unit 10 determines that the mass flow controller 4J does not properly control the flow rate (abnormal).

<Flow Rate Verification Failure Diagnosis Method>

Figure 3:
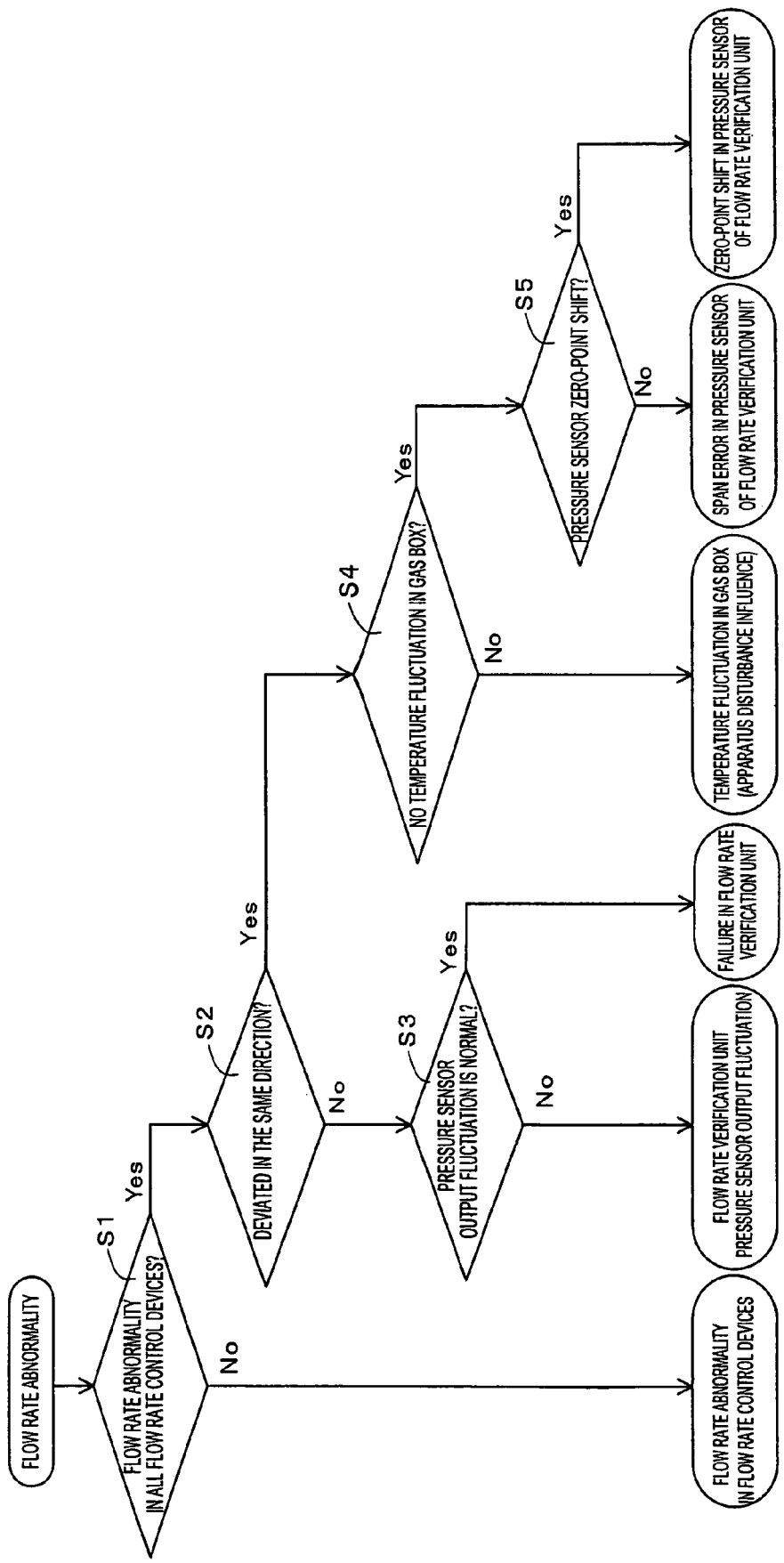
FIG. 3 is a flowchart showing operations of the flow rate verification failure diagnosis program executed by a higher-level apparatus shown in FIG. 2.

The flow rate verification failure diagnosis method will be described with reference to FIG. 3. FIG. 3 is a flowchart showing operations of the flow rate verification failure diagnosis program 30 executed by the higher-level apparatus 23 shown in FIG. 2.

The higher-level apparatus 23 completes the flow rate verification on all of the mass flow controllers 4 in the gas box 20, and detection of the flow rate abnormality triggers the execution of the flow rate verification failure diagnosis program 30 shown in FIG. 3.

Concretely, the higher-level apparatus 23 determines whether the flow rate abnormality occurs in all of the mass flow controllers 4 (flow rate control devices) in step 1 (hereinbelow, written as "S1") in FIG. 3. In the case where it is determined that no flow rate abnormality occurs in all of the mass flow controllers 4 (S1:No), the higher-level apparatus 23 determines that the mass flow controller 4 that detects flow rate abnormality fails.

On the other hand, in the case where the higher-level apparatus 23 determines that there is flow rate abnormality in all of the mass flow controllers 4 (S1:Yes), whether or not all of the flow rates Q of the mass flow controllers 4 in which flow rate abnormality occurs are deviated in the same direction from the set flow rate is determined in S2. In the case where all of the flow rates Q of the mass flow controllers 4 in which flow rate abnormality occurs are not deviated in the same direction from the set flow rate (S2:No), in S3, whether pressure fluctuation in the pressure sensor 12 is normal or not is determined. The determining method will be described later. In the case where the pressure fluctuation in the pressure sensor 12 is not normal (S3:No), it is determined that abnormality occurs in the output fluctuation in the pressure sensor 12 of the flow rate verification unit 10. On the other hand, in the case where the pressure fluctuation in the pressure sensor 12 is normal (S3:Yes), it is determined that the flow rate verification unit 10 fails.

In the case where all of the flow rates Q of the mass flow controllers 4 in which flow rate abnormality occurs are deviated in the same direction from the set flow rate (S2:Yes), in S4, the temperature measured by the gas box temperature sensor 22 is inputted via the controller 21, and whether fluctuation occurs in the temperature in the gas box 20 or not is determined. In the case where it is determined that temperature fluctuates in the gas box 20 (S4:No), it is determined that flow rate abnormality is detected on the basis of the temperature change in the gas box 20 (the apparatus disturbance influence). A failure caused by the temperature change (disturbance) in the gas box 20 may be directly determined by the controller 21 in the flow rate verification failure diagnosis apparatus 8.

In the case where it is determined that there is no temperature fluctuation in the gas box 20 (S4:Yes), in S5, whether the zero point of the pressure sensor 12 shifts or not is detected. The process of detecting the zero-point shift in the pressure sensor 12 will be described later. In the case where it is determined that the zero point of the pressure sensor 12 does not shift (S5:No), it is determined that the flow rate abnormality is detected due to occurrence of a span error in the pressure sensor 12 of the flow rate verification unit 10. When it is determined that the zero point of the pressure sensor 12 shifts (S5:Yes), the cause of the flow rate abnormality detected is determined as the shift of the zero point of the pressure sensor 12.

<Pressure Sensor Output Fluctuation Detecting Method>

Figure 4:
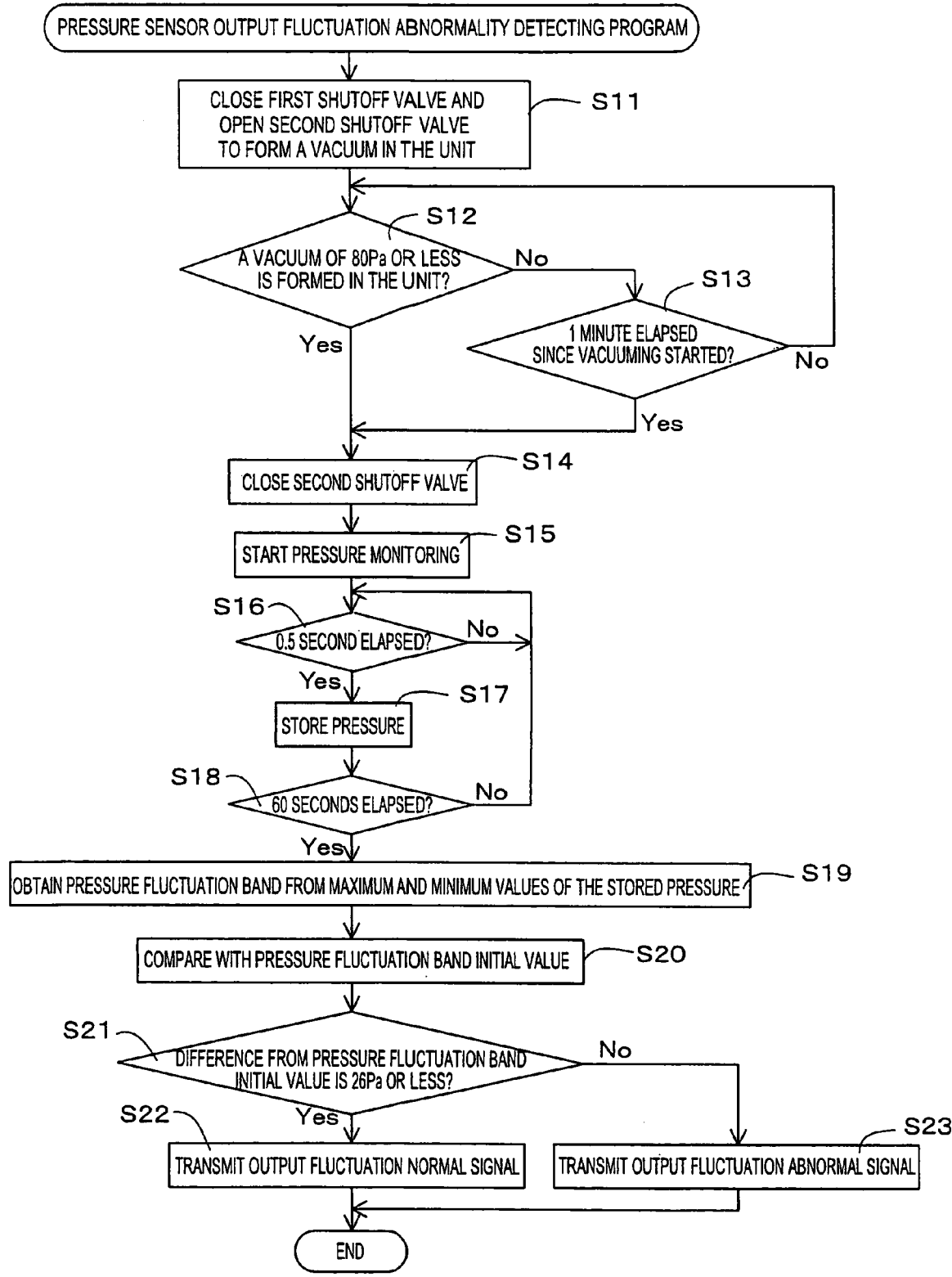
FIG. 4 is a flowchart of a pressure sensor output fluctuation abnormality detection program shown in FIG. 2.

FIG. 4 is a flowchart of the pressure sensor output fluctuation abnormality detection program 37 shown in FIG. 2.

In the case of detecting whether the output fluctuation of the pressure sensor 12 is normal or not (S3 in FIG. 3), the higher-level apparatus 23 transmits an output fluctuation detection instruction to the controller 21 of the flow rate verification failure diagnosis apparatus 8. When the controller 21 receives the output fluctuation detection instruction, the CPU 31 reads the pressure sensor output fluctuation abnormality detection program 37 from the NVRAM 34, copies it to the RAM 33, and executes it. Thereby, the controller 21 determines whether the output fluctuation of the pressure sensor 12 is normal or not.

Concretely, in the case of performing the failure diagnosis of the gas supply pipe system 25, the higher-level apparatus 23 closes the input open/close valve 3 and the output open/close valve 5 in each of the gas units 6 and the gas supply valve 15 to cut off the supply of the process gas to a not-shown treatment chamber. The controller 21 closes the first and second shutoff valves 11 and 14 to cut off a discharge line. When an output fluctuation detection instruction is received from the higher-level apparatus 23 to the controller 21, the controller 21 opens the second shutoff valve 14 while the first shutoff valve 11 of the flow rate verification unit 10 is closed in S11 in FIG. 4, thereby forming a vacuum in a tank (in the flow rate verification unit 10) constructed by pipe lines connecting the first and second shutoff valves 11 and 14.

The controller 21 determines whether the pressure in the flow rate verification unit 10 becomes equal to or less than a predetermined pressure on the basis of a pressure detection result of the pressure sensor 12 in S12. The predetermined pressure is determined from the capability of a vacuum pump, the precision of the pressure sensor, and the precision of the flow rate verification. In the present embodiment, the predetermined pressure is set as 80 Pa. In the case where the pressure in the flow rate verification unit 10 is decreased to 80 Pa or less to form a vacuum (S12:Yes), the program advances to S14.

On the other hand, in the case where the pressure in the flow rate verification unit 10 is not decreased to 80 Pa or less to form a vacuum (S12:No), in S13, whether vacuuming time has elapsed one minute or not is determined. When the vacuuming time has not elapsed one minute (S13:No), the program returns to S12. In contrast, even when the pressure in the flow rate verification unit 10 has not been decreased to 80 Pa or less and a vacuum is not formed yet (S12:No), if the vacuuming time has elapsed one minute (S13:Yes), the program advances to S14 for the following reason. For example, in the case where the pressure sensor 12 does not accurately measure the pressure in the flow rate verification unit 10 due to a failure or the like, the flow rate verification unit 10 is prevented from being broken down due to excessive vacuuming.

The second shutoff valve 14 is closed in S14, and the pressure between the first shutoff valve 11 and the second shutoff valve 15 is started to be monitored by the pressure sensor 12 in S15. In S16, whether or not 0.5 second has elapsed since the pressure monitor has started is determined. Until 0.5 second elapses (S16:No), the pressure sensor 12 waits.

On the other hand, when 0.5 second elapses after the pressure monitor started (S16:Yes), in S17, the pressure measured by the pressure sensor 12 is stored in the RAM 33. Accordingly, in S18, whether 60 seconds have elapsed since the pressure monitor started or not is determined. In the case where 60 seconds have not elapsed since the pressure monitor started (S18:No), the program returns to S16 and determines whether or not 0.5 second has elapsed since the pressure was received from the pressure sensor 12 and stored in the RAM 33. After a lapse of 0.5 second, the controller 21 stores the pressure measured by the pressure sensor 12 again to the RAM 33.

As mentioned above, the pressure is sampled every 0.5 second during 60 seconds since the pressure monitor was started (S18:Yes), in S19, the maximum and minimum values of 120 pieces of pressure sampling data stored in the RAM 33 are obtained, so that the pressure fluctuation band is calculated from the difference between the maximum and minimum values.

In S20, the "pressure fluctuation band initial value" is read out from the pressure fluctuation band initial value storing member 39 and compared with the pressure fluctuation band obtained in S19. In S21, whether the difference between the pressure fluctuation band obtained in S19 and the initial value is within an allowable fluctuation pressure band or not is determined, thus recognizing how much the output value of the pressure sensor 12 is deviated from the initial value. The allowable fluctuation pressure band is set according to the precision of the flow rate verification. Preferably, the severer the flow rate verification precision is, the more the allowable fluctuation pressure band is decreased. In the present embodiment, the allowable fluctuation pressure band is set to 26 Pa.

In the case where the difference between the pressure fluctuation band obtained in S19 and the "pressure fluctuation band initial value" is 26 Pa or less (S21:Yes), in S22, it is determined that the output fluctuation of the pressure sensor 12 is normal. Accordingly, an output fluctuation normal signal is transmitted to the higher-level apparatus 23, and the process is finished.

On the other hand, when the difference between the pressure fluctuation band obtained in S19 and the "pressure fluctuation band initial value" is not 26 Pa or less (S21:No), in S23, it is determined that the output fluctuation of the pressure sensor 12 is abnormal. Accordingly, an output fluctuation abnormal signal is transmitted to the higher-level apparatus 23 and, the process is finished.

In S3 in FIG. 3, when the output fluctuation normal signal is received from the controller 21, the higher-level apparatus 23 determines that flow rate abnormality occurs due to output fluctuation abnormality in the flow rate verification unit 10.

On the other hand, in S3 in FIG. 3, when the output fluctuation abnormal signal is received from the controller 21, the higher-level apparatus 23 determines that flow rate abnormality occurs due to an output fluctuation abnormality in the pressure sensor 12 of the flow rate verification unit 10.

<Pressure Sensor Zero-Point Shift Detecting Method>

Figure 5:
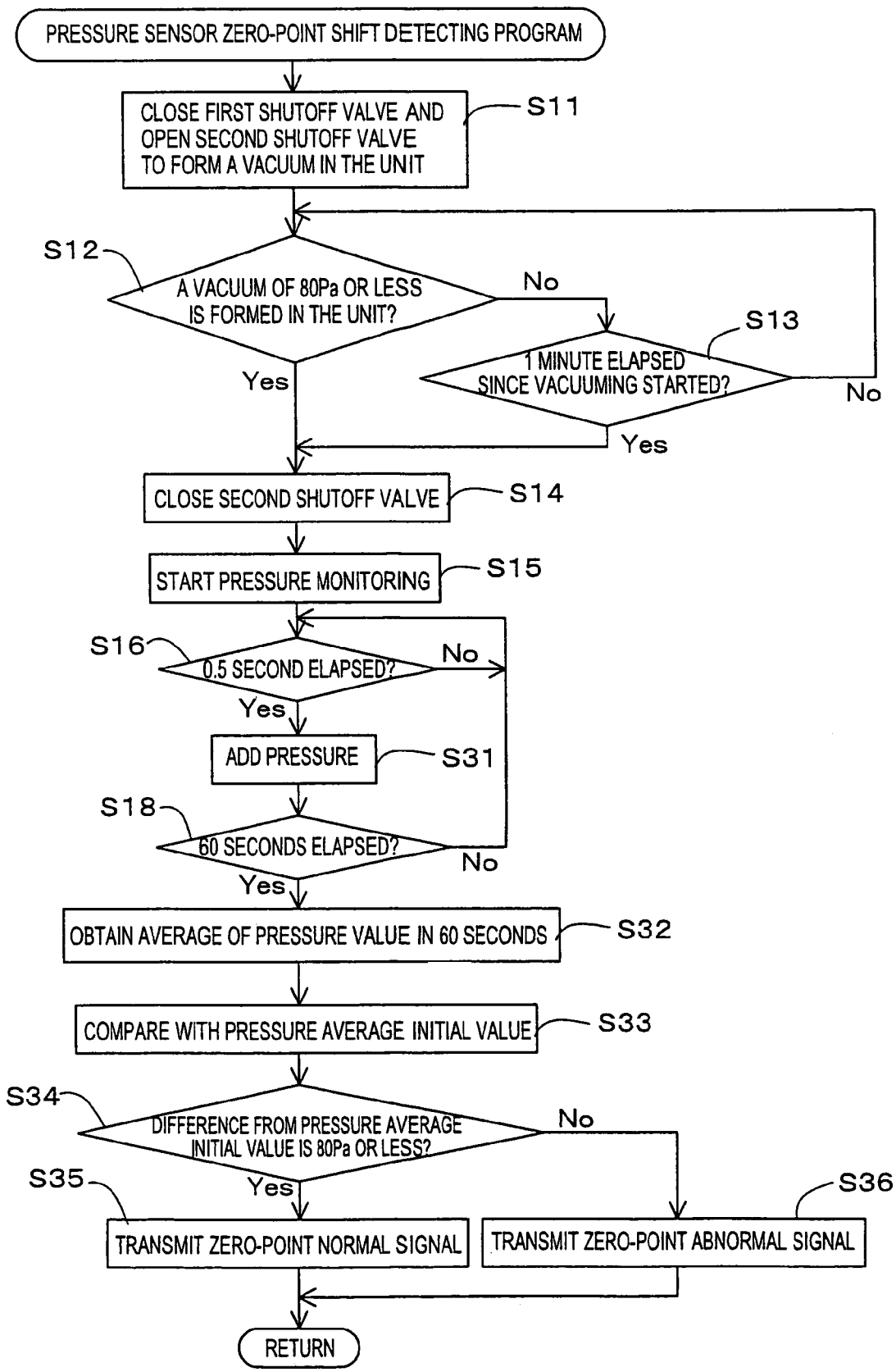
FIG. 5 is a flowchart of a pressure sensor zero-point shift detecting program shown in FIG. 3.

A method of detecting a zero-point shift of the pressure sensor 12 will be described. FIG. 5 is a flowchart showing the operation of a pressure sensor zero-point shift detecting program illustrated in FIG. 3.

In the case of determining whether the zero point of the pressure sensor 12 has shifted or not in S5 in FIG. 3, the higher-level apparatus 23 transmits a zero-point shift detection instruction to the controller 21 of the flow rate verification failure diagnosis apparatus 8. When the controller 21 receives the zero-point shift detection instruction, the CPU 31 reads out the zero-point shift detection program 38 from the NVRAM 34, copies it into the RAM 33, and executes it. As a result, the controller 21 determines whether the zero point of the pressure sensor 12 is normal or not. The pressure sensor zero-point shift detecting process is basically similar to the pressure sensor output fluctuation detecting process shown in FIG. 4 except for handling of the pressure measured by the pressure sensor 12. Therefore, the points different from the pressure sensor output fluctuation abnormality detecting process shown in FIG. 4 will be mainly described. The same reference numerals are assigned to process similar to the pressure sensor output fluctuation abnormality detecting process shown in FIG. 4 in the diagram, and description thereof is accordingly omitted.

When a vacuum of 80 Pa or less is formed in the flow rate verification unit 10, or after one minute elapsed since the flow rate verification unit 10 started to be evacuated, the CPU 31 closes the second shutoff valve 14 and subsequently starts monitoring the pressure in the flow rate verification unit 10 on the basis of the measurement result of the pressure sensor 12 (see S11, S12:Yes, S13:Yes, S14, and S15). The CPU 31 obtains the pressure detection result from the pressure sensor 12 every 0.5 second for a period of time since the pressure monitor was started until 60 seconds elapse. In the CPU 31, a pressure addition value is obtained by adding a newly measured pressure to the pressures measured until just before the newly obtained pressure is measured, and the CPU 31 overwrites the pressure addition value with the calculated value to store in the RAM 33 (S14, S16:Yes, S31, and S18:No).

When 60 seconds have elapsed since the pressure monitor started (S18:Yes), in S32, a pressure addition value stored in the RAM 33 is divided by the number of sampling times (120), thereby calculating an average of the pressure values (pressure average value) in 60 seconds. The "pressure average initial value" is read out from the pressure average initial value storing member 40 in S33 and compared with the pressure average value calculated in S32. In S34, whether or not the difference between the pressure average value calculated in S32 and the "pressure average initial value" is equal to or less than an allowable pressure value is determined. The allowable pressure value is set according to the precision of the flow rate verification. Preferably, the severer the flow rate verification precision is, the more the allowable pressure value is decreased. In the present embodiment, the allowable pressure value is set to 80 Pa.

In the case where the difference between the pressure average value calculated in S32 and the pressure average initial value is 80 Pa or less (S34:Yes), in S35, it is determined that the zero point of the pressure sensor 12 is normal. A zero-point normal signal is transmitted to the higher-level apparatus 23, and then, the process is finished.

On the other hand, when the difference between the pressure average value calculated in S32 and the pressure average initial value is not 80 Pa or less (S34:No), in S36, it is determined that the zero point of the pressure sensor 12 is abnormal. A zero-point abnormal signal is transmitted to the higher-level apparatus 23, and, the process is finished.

In S5 in FIG. 3, when the zero-point normal signal is received from the controller 21, the higher-level apparatus 23 determines that flow rate abnormality occurs due to a span error in the pressure sensor 12.

On the other hand, in S5 in FIG. 3, when the zero-point abnormal signal is received from the controller 21, the higher-level apparatus 23 determines that the flow rate abnormality occurs due to the zero-point shift of the pressure sensor 12 of the flow rate verification unit 10.

<Operations and Advantages>

In the case where the flow rate verification unit 10 detects flow rate abnormality in any of the mass flow controllers 4, the flow rate verification failure diagnosis apparatus 8 of the first embodiment diagnoses a failure in the pressure sensor 12 of the flow rate verification unit 10 thereby separating the flow rate abnormality caused by a failure in the pressure sensor 12 from the flow rate abnormality caused by a failure in the mass flow controller 4. Therefore, by the flow rate verification failure diagnosis apparatus 8 of the first embodiment, the flow rate abnormality is not erroneously determined as abnormality caused by a failure in the mass flow controller 4 until it is determined that the flow rate abnormality is caused by a failure in the pressure sensor 12. Thus, the reliability of the flow rate verification can be improved.

In particular, the flow rate verification failure diagnosis apparatus 8 of the first embodiment diagnoses a failure in the pressure sensor 12 under the same conditions as those when the flow rate abnormality is detected without detaching the mass flow controller 4 from the gas unit 6. Therefore, the flow rate verification failure diagnosis apparatus 8 can clearly distinguish between the case where the flow rate abnormality is caused by a failure in the pressure sensor 12 and the case where the flow rate abnormality is caused by a failure in the mass flow controller 4.

In the flow rate verification failure diagnosis apparatus 8, the flow rate verification failure diagnosis system 26, and the flow rate verification failure diagnosis method of the first embodiment, the flow rate verification unit 10 is evacuated, and the first and second shutoff valves 11 and 14 are closed to hermetically close the flow rate verification unit 10. After that, the pressure in the flow rate verification unit 10 is measured by the pressure sensor 12 and monitored (see S11, S12:Yes, S13:Yes, S14, S15, S16:Yes, S31, and S18:Yes in FIG. 5). The flow rate verification failure diagnosis apparatus 8 compares the pressure average value obtained by averaging the pressures measured by the pressure sensor 12 and the pressure average initial value with each other. When the difference exceeds the permissible range (80 Pa in the embodiment), the flow rate verification failure diagnosis apparatus 8 determines occurrence of a failure such that the zero point shifts in the pressure sensor 12 (see S32, S33, S34:No, and S36 in FIG. 5). Therefore, the flow rate verification failure diagnosis apparatus 8 of the first embodiment can detect the cause of the flow rate abnormality, which is the zero-point shift of the pressure sensor 12 separately from the other failures. Thus, the failure can be handled more easily.

In the flow rate verification failure diagnosis apparatus 8, the flow rate verification failure diagnosis system 26, and the flow rate verification failure diagnosis method of the first embodiment, the flow rate verification unit 10 is evacuated, and then the first and second shutoff valves 11 and 14 are closed to hermetically close the flow rate verification unit 10. After that, the pressure in the flow rate verification unit 10 is measured by the pressure sensor 12 and monitored (see S11, S12:Yes, S13:Yes, S14, S15, S16:Yes, S17, and S18:Yes in FIG. 4). Subsequently, the flow rate verification failure diagnosis apparatus 8 compares the output fluctuation band of the pressure measured by the pressure sensor 12 and the output fluctuation band initial value of the pressure sensor 12. When the difference exceeds the allowable range, the flow rate verification failure diagnosis apparatus 8 determines occurrence of a failure such that output fluctuation abnormality occurs in the pressure sensor 12 (see S19, S20, S21:No, and S23 in FIG. 4). Therefore, the flow rate verification failure diagnosis apparatus 8 of the first embodiment can detect the cause of the flow rate abnormality, which is the output fluctuation abnormality in the pressure sensor 12 separately from the other failures. Thus, the failure can be handled more easily.

In the case where the flow rate verification unit 10 detects flow rate abnormality in any of the mass flow controllers 4, when the temperature in the gas box 20 changes, the flow rate verification failure diagnosis apparatus 8 (higher-level apparatus 23) and the flow rate verification failure diagnosis system 26 of the first embodiment determine that the flow rate abnormality occurs due to a change in the temperature in the gas box 20. Therefore, the flow rate abnormality that is caused by the temperature change in the gas box 20 (disturbance) can be detected separately from the other failures. The failure can be handled more easily.

In the flow rate verification failure diagnosis system 26 and the flow rate verification failure diagnosis method of the first embodiment, when the flow rate verification unit 10 determines that flow rate abnormality occurs in all of the mass flow controllers 4, it is determined that there is a failure as the cause of the flow rate abnormality other than the mass flow controllers 4. When the flow rate verification unit 10 determines that there is flow rate abnormality only in a specific mass flow controller 4, it is determined that there is a failure as the cause of the flow rate abnormality in the specific mass flow controller 4. In this way, the flow rate verification unit 10 discriminates between the case where the cause of flow rate abnormality exists in a mass flow controller and the case where the cause of flow rate abnormality does not exist in a mass flow controller (see S1 in FIG. 3). Therefore, the flow rate verification failure diagnosis system 26 and the flow rate verification failure diagnosis method of the first embodiment can distinguish between the case where the cause of flow rate abnormality is in the mass flow controller 4 and the case where the cause is somewhere else under the same conditions as those when the flow rate is verified before the mass flow controller 4 is detached and tested. Thus, the reliability of the flow rate verification can be improved.

The flow rate verification failure diagnosis program 30 of the first embodiment measures the flow rates of the plurality of mass flow controllers 4 on the basis of the pressure measured by the pressure sensor 12. In the case where the flow rate verification unit 10 detects flow rate abnormality, the higher-level apparatus 23 controlling the flow rate verification unit 10 performing a flow rate verification is allowed to diagnose a failure as the cause of the flow rate abnormality (see FIG. 3). Thus, the causes of the flow rate abnormalities can be distinguished from each other, so that the reliability of the flow rate verification can be enhanced.

Second Embodiment

A second embodiment of a flow rate verification failure diagnosis apparatus of the present invention will now be described with reference to the drawings.

<General Configuration of Flow Rate Verification Failure Diagnosis Apparatus>

Figure 6:
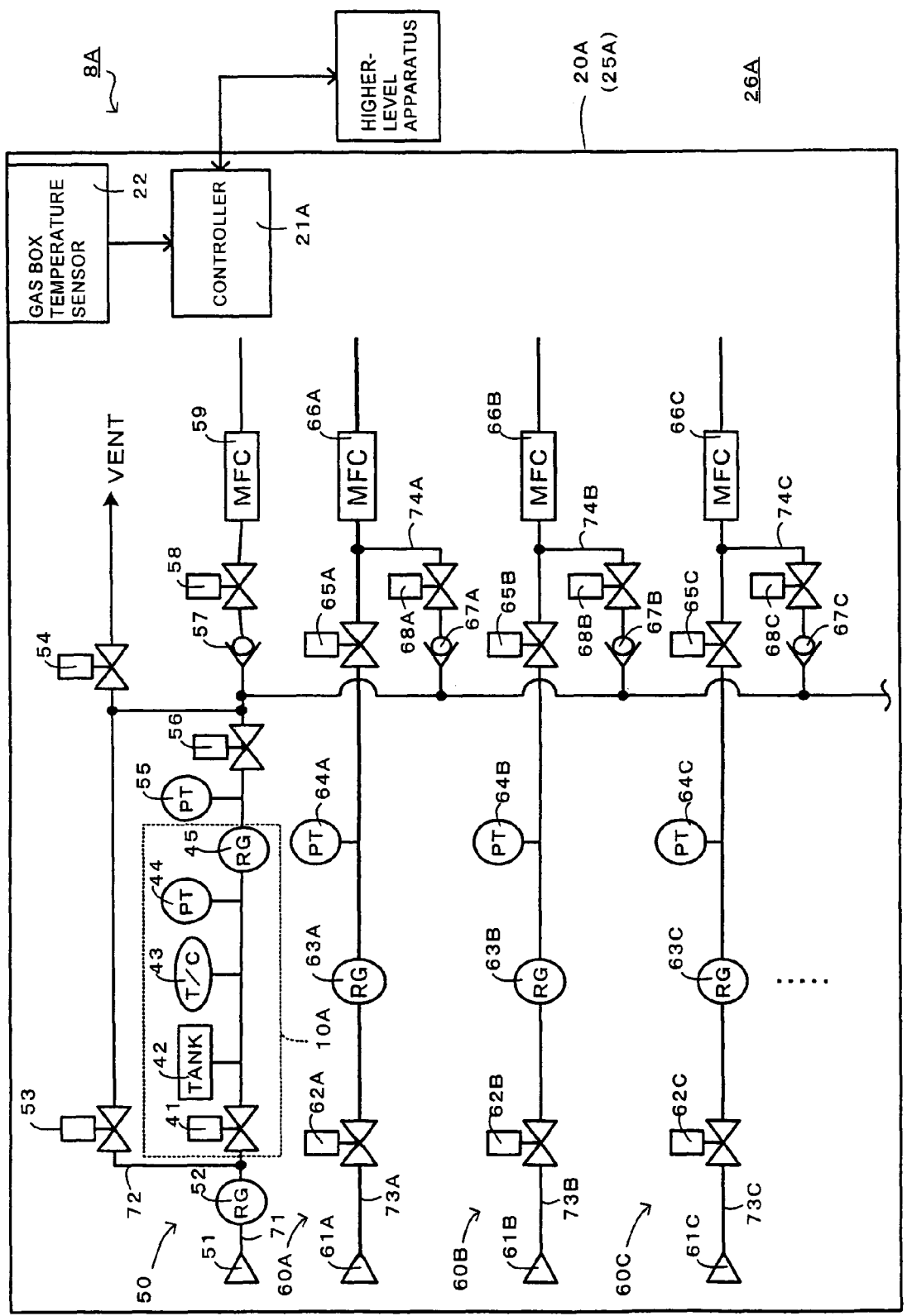
FIG. 6 is a schematic configuration diagram of a flow rate verification failure diagnosis apparatus and a flow rate verification failure diagnosis system in a second embodiment.

FIG. 6 is a diagram showing a schematic configuration of a flow rate verification failure diagnosis apparatus 8A and a flow rate verification failure diagnosis system 26A.

The flow rate verification failure diagnosis apparatus 8A and the flow rate verification failure diagnosis system 26A of the second embodiment are different from the flow rate verification failure diagnosis apparatus of the first embodiment with respect to the point that they are applied to a gas supply pipe system 25A having a flow rate verification unit 10A. The points different from the first embodiment will be mainly described here. The same reference numerals are designated to the same components as those in the first embodiment in the drawings, and their description will not be repeated. The subscripts "A", "B", "C", . . . of the reference numerals are attached for convenience so that gas units and the like are distinguished from each other. In the following, when it is unnecessary to distinguish the components from each other, the subscripts are not shown.

The flow rate verification failure diagnosis apparatus 8A has, in a gas box 20A, a circuit configuration for supplying purge gas from a purge gas unit 50 to a plurality of gas units 60A, 60B, 60C, . . . . In the flow rate verification failure diagnosis apparatus 8A, the purge gas unit 50 is obtained by connecting a regulator 52, a second pressure sensor 55 as an example of "second pressure measuring member", a measurement open/close valve 56, a check valve 57, a purge gas supply valve 58, and a mass flow controller 59 in series, thereby constructing a part of a purge gas line 71. The flow rate verification unit 10A (which will be described later) is disposed between the regulator 52 and the second pressure sensor 55. In such the purge gas unit 50, the regulator 52 is connected to a purge gas supply source 51, and the mass flow controller 59 is connected to a not-shown treatment chamber. A discharge line 72 is connected on the downstream side of the regulator 52. In the discharge line 72, a first discharge valve 53 and a second discharge valve 54 are disposed from the upstream side. The discharge line 72 is connected to a not-shown vacuum pump.

In the gas unit 60, an input valve 62, a regulator 63, a third pressure sensor 64, an output valve 65, and a mass flow controller 66 are connected in series. The gas unit 60 serves as a part of a gas line 73. In the gas unit 60, a purge gas supply line 74 branched from the purge gas line 71 is connected on the upstream side of the mass flow controller 66. In the purge gas supply line 74, a check valve 67 and a purge gas input valve 68 are disposed in order from the upstream side. In such the gas unit 60, the input valve 62 is connected to a process gas supply source 61, and the mass flow controller 66 is connected to a not-shown treatment chamber. To each of the gas lines 60, process gases A, B, C, . . . of different kinds are supplied.

<Flow Rate Verification Unit>

The flow rate verification unit 10A is obtained by connecting a shutoff valve 41, a tank 42, a temperature sensor 43, a first pressure sensor 44 serving as an example of "first pressure measuring member", and a regulator 45 in order from the upstream side. Since the volume between the regulator 52 and the measurement open/close valve 56 is small, the flow rate verification unit 10A assures volume necessary for measuring pressure drop time by providing the tank 42. The regulator 45 is provided to make the primary-side pressure of the mass flow controllers 59, 66A, 66B, 66C, . . . constant at the time of flow rate verification.

<Electric Block Configuration of Controller>

Figure 7:
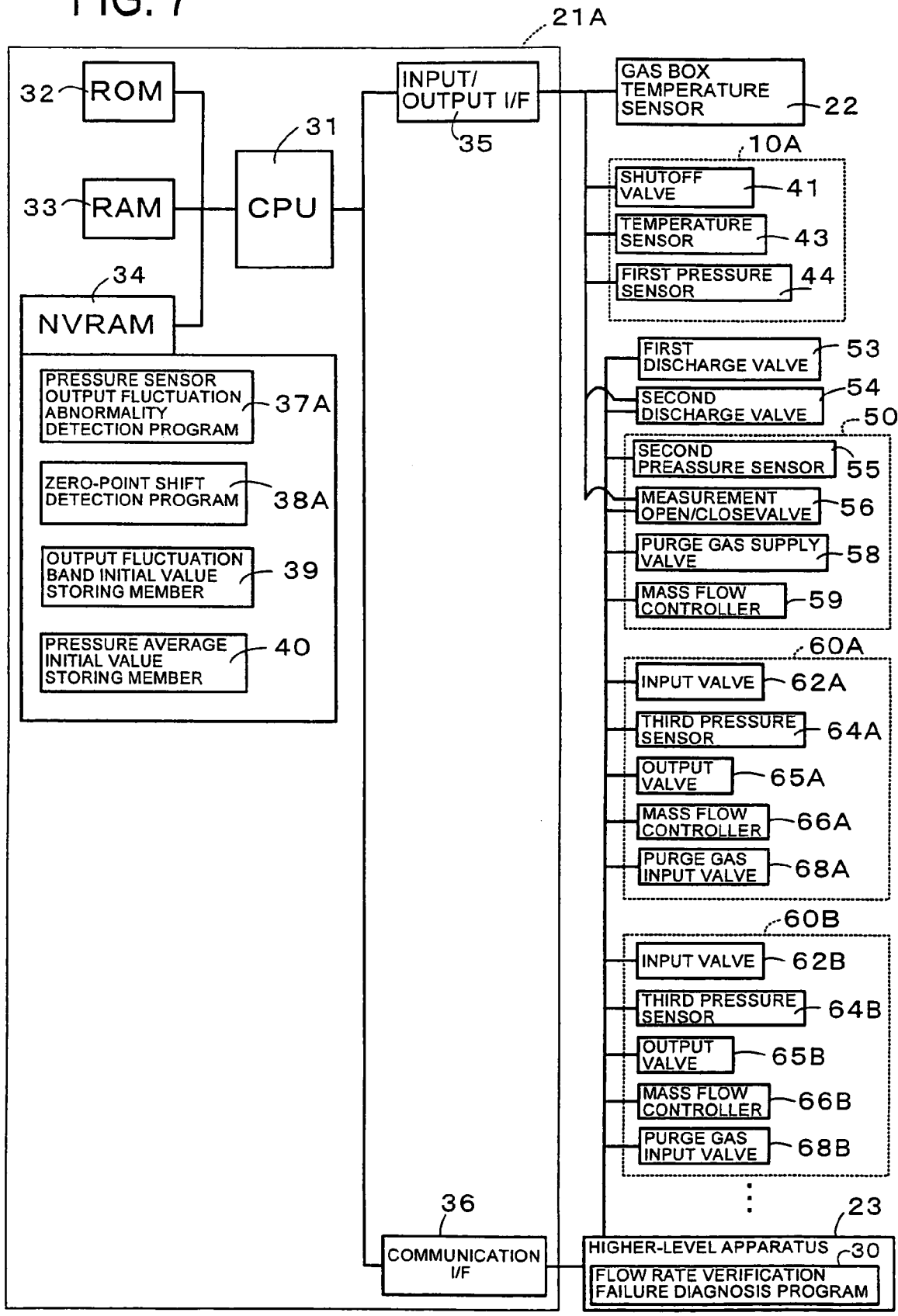
FIG. 7 is an electric block diagram of a controller shown in FIG. 6.

FIG. 7 is an electric block diagram of a controller 21A shown in FIG. 6.

The controller 21A is a microcomputer similar to that in the first embodiment. However, the flow rate verification is performed by the pressure drop method, so that the processes in a pressure sensor output fluctuation abnormality detection program 37A and a pressure sensor zero-point shift detection program 38A are different from those of the first embodiment.

To the input/output I/F 35, the gas box temperature sensor 22 and the shutoff valve 41, the temperature sensor 43, and the first pressure sensor 44 in the flow rate verification unit 10A are connected. To the input/output I/F 35, the second discharge valve 54 and the measurement open/close valve 56 are also connected.

To the higher-level apparatus 23, the first and second discharge valves 53 and 54, the second pressure sensor 55, the measurement open/close valve 56, the purge gas supply valve 58, and the mass flow controller 59 in the purge gas unit 50, the input valve 62, the third pressure sensor 64, the output valve 65, the mass flow controller 66, and the purge gas input valve 68 of each of the gas units 60 are connected.

<Flow Rate Verification Method>

For example, in the case of performing a flow rate verification of a mass flow controller 66A, the higher-level apparatus 23 closes input valves 62A, 62B, and 62C and output valves 65A, 65B, and 65C of process gas lines 73A, 73B, and 73C to interrupt supply of the process gases A, B, and C. Further, the higher-level apparatus 23 closes the first and second discharge valves 53 and 54 to interrupt discharge. The higher-level apparatus 23 also closes the purge gas supply valve 58 and purge gas input valves 68B and 68C and opens the shutoff valve 41, the measurement open/close valve 56, and a purge gas input valve 68A, thereby replacing the process gas residing in the process gas line 73A with purge gas.

During replacement with purge gas, the regulator 52 adjusts the pressure of the purge gas to the set pressure. After the purge gas line 71 is stabilized in the set pressure, the higher-level apparatus 23 closes the shutoff valve 41 to interrupt the supply of the purge gas. Even after that, the purge gas is outputted from the mass flow controller 66A, and the measurement value of the first pressure sensor 44 gradually decreases. At this time, the regulator 45 adjusts the pressure on its downstream side to the set pressure, thereby preventing a volume change in the check valves 57, 67A, 67B, 67C, . . . , so that the flow rate measurement of the mass flow controller 66A can be performed in a stable manner. The higher-level apparatus 23 measures pressure drop time until the first pressure sensor 44 measures a target pressure. On the basis of the pressure drop time, the higher-level apparatus 23 measures flow rate of the mass flow controller 66A. The higher-level apparatus 23 then compares between the pressure drop time in the initial state of the mass flow controller 66A and the pressure drop time which is measured this time, thereby calculating a flow rate change rate, and the flow rate verification of the mass flow controller 66A is performed.

When flow rate abnormality is detected by the above mentioned flow rate verification, the higher-level apparatus 23 executes the failure diagnosis program shown in FIG. 3. At this time, the pressure sensor output fluctuation abnormality detecting process and the pressure sensor zero-point shift detecting process are performed as follows.

<Pressure Sensor Output Fluctuation Abnormality Detection>

Figure 8:
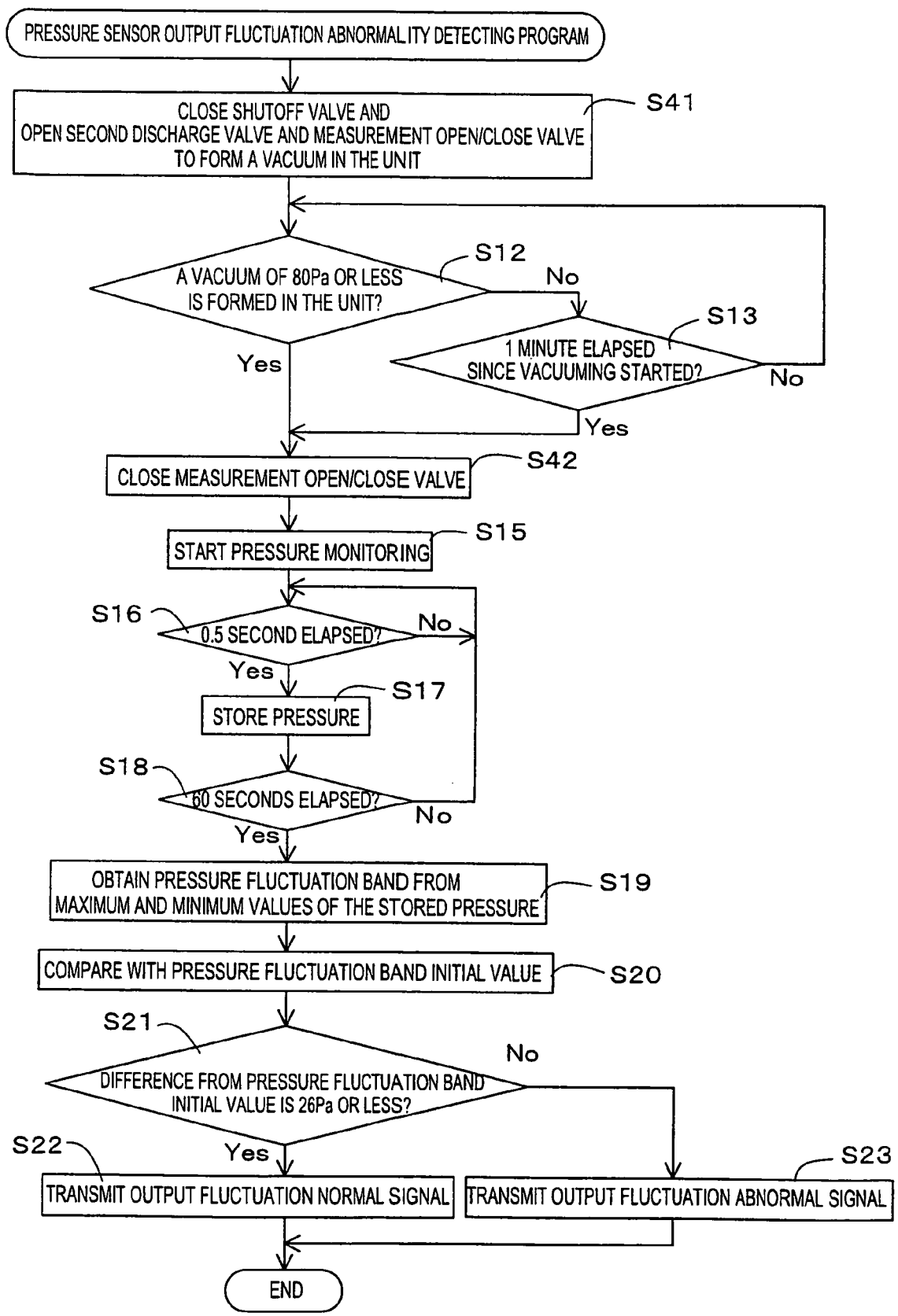
FIG. 8 is a flowchart of a pressure sensor output fluctuation abnormality detection program shown in FIG. 7.

FIG. 8 is a flowchart of the pressure sensor output fluctuation abnormality detection program 37A shown in FIG. 7.

When the controller 21A receives a pressure fluctuation detection instruction from the higher-level apparatus 23, the CPU 31 reads out the pressure sensor output fluctuation abnormality detection program 37A from the NVRAM 34, copies it to the RAM 33, and executes it. By this operation, the controller 21A detects output fluctuation abnormality of the first pressure sensor 44. The pressure sensor output fluctuation abnormality detecting process shown in FIG. 8 is applied to the gas supply pipe system 25A having the flow rate verification unit 10A, so that the processes until the pressure in the system 8A is started to be monitored by the first pressure sensor 44 are different from the first embodiment.

At the time of determining whether an output fluctuation of the first pressure sensor 44 is normal or not, the higher-level apparatus 23 closes the first and second discharge valves 53 and 54 and the purge gas input valves 68A, 68B, 68C . . . to interrupt the supply and discharge of the purge gas. The higher-level apparatus 23 also closes the input valves 62A, 62B, 62C, . . . and the output valves 65A, 65B, 65C, . . . to interrupt supply of the process gas. In this state, the controller 21A closes the shutoff valve 41 and opens the second discharge valve 54 and the measurement open/close valve 56, thereby forming a vacuum in the flow rate verification unit 10A (see S41).

In the case where the pressure measured by the first pressure sensor 44 becomes equal to or less than 80 Pa, or in the case where one minute elapsed since vacuuming was started, the controller 21A closes the measurement open/close valve 56 (see S12:Yes, S13:Yes, and S42).

After that, the controller 21A measures pressure by the first pressure sensor 44 every 0.5 second, stores the pressure in the RAM 33, and monitors the pressure in the unit 10A. When 60 seconds elapsed after the pressure monitor started, the controller 21A obtains pressure fluctuation band on the basis of the maximum pressure value and the minimum pressure value stored in the RAM 33, determines whether there is abnormality in the output fluctuation of the first pressure sensor 44 on the basis of the difference between the pressure fluctuation band and the pressure fluctuation band initial value, transmits the determination result to the higher-level apparatus 23, and finishes the process (see S15 to S23).

<Pressure Sensor Zero-point Shift Detecting Process>

Figure 9:
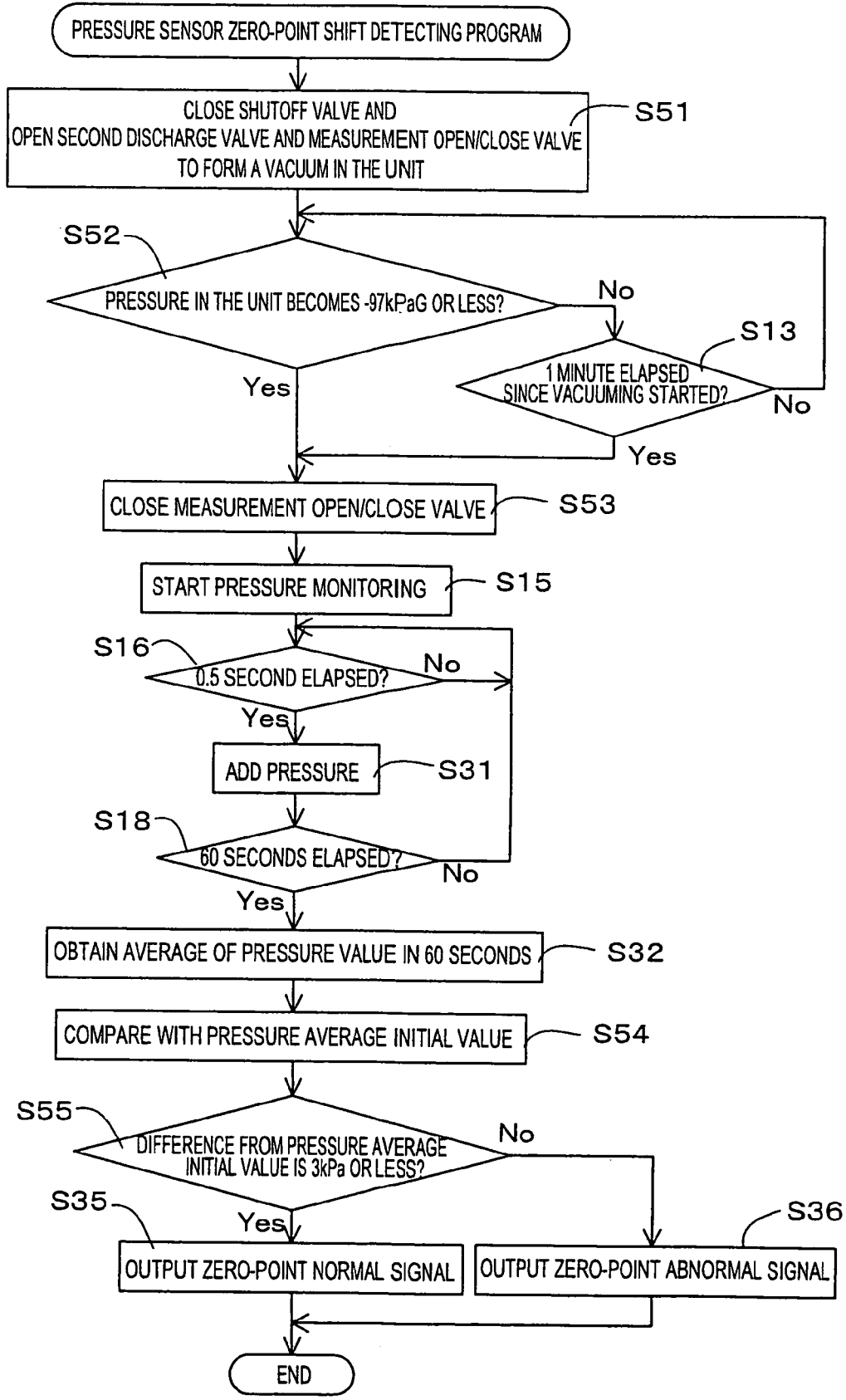
FIG. 9 is a flowchart of a pressure sensor zero-point shift detecting program shown in FIG. 7.

Next, the pressure sensor zero-point shift detecting process will be described. FIG. 9 is a flowchart of the pressure sensor zero-point shift detecting program 38A illustrated in FIG. 7.

Since the pressure sensor zero-point shift detecting process shown in FIG. 9 is applied to the gas supply pipe system 25A including the flow rate verification unit 10A, processes performed before the first pressure sensor 44 starts monitoring the pressure in the system 8A and a pressure value as a criterion are different from those of the first embodiment.

At the time of determining whether the zero point of the first pressure sensor 44 has shifted or not, the higher-level apparatus 23 closes the first and second discharge valves 53 and 54 and the purge gas input valves 68A, 68B, 68C, . . . to interrupt the supply and discharge of the purge gas. The higher-level apparatus 23 also closes the input valves 62A, 62B, 62C, . . . and the output valves 65A, 65B, 65C, . . . to interrupt the supply of the process gas. In S51, the controller 21A closes the shutoff valve 41 and opens the second discharge valve 54 and the measurement open/close valve 56 in a state where the first discharge valve 53, the purge gas supply valve 58 of the purge gas unit 50, and the purge gas input valve 68 of each of the gas units 60 are closed. In this state, the not-shown vacuum pump is driven by the higher-level apparatus 23 to form a vacuum in the flow rate verification unit 10A.

In S52, on the basis of the pressure measured by the first pressure sensor 44, the pressure in the unit 10A becomes equal to or less than the predetermined value is determined. The predetermined value is set in a manner similar to that at the time where the pressure rises (for example, see S12 in FIG. 5). In the present embodiment, the predetermined value is −97 kPaG.

When the pressure in the unit 10A becomes equal to or less than −97 kPaG (S52:Yes), the program advances to S53. On the other hand, when the pressure in the unit 10A is not −97 kPaG or less (S52:No), whether vacuuming time exceeds one minute or not is determined in S13. When the vacuuming time has not elapsed one minute (S13:No), the program returns to S52. In contrast, when the vacuuming time elapsed one minute (S13:Yes) even if the pressure in the unit 10A is not equal to or less than −97 kPaG, the program advances to S53.

In S53, the measurement open/close valve 56 is closed, and hermetic space is formed between the shutoff valve 41 and the measurement open/close valve 56. In S15, the first pressure sensor 44 starts monitoring the pressure in the unit 10A. The controller 21A obtains the pressure detection result from the first pressure sensor 44 every 0.5 second until 60 seconds elapse since the pressure monitor started. Each time the pressure measurement result is obtained, the controller 21A obtains a pressure addition value obtained by adding a newly measured pressure to pressures measured until just before the pressure measurement, and overwrites the pressure addition value stored in the RAM 33 with the calculated value (see S16:Yes, S31, and S18:No). When 60 seconds elapse after the pressure monitor started, the pressure addition value stored in the RAM 33 is divided by the number of sampling times (120) of the pressure, thereby calculating a pressure average value. The obtained pressure average value is compared with the "pressure average initial value" (see S32 and S54).

In S54, the difference between the pressure average value and the "pressure average initial value" is obtained, and whether the value of deviation of the pressure average value from the "pressure average initial value" is equal to or less than an allowable pressure value or not is determined. Preferably, the allowable pressure value is determined in a manner similar to that at the time of pressure rise (for example, see S34 in FIG. 5). In the present embodiment, the allowable pressure value is set to 3 kPa. In the case where the value of deviation of the pressure average value from the "pressure average initial value" is equal to or less than the allowable pressure value (S54:Yes), a zero-point normal signal indicating that the pressure sensor zero point is normal is transmitted to the higher-level apparatus 23 in S35, and the process is finished. On the other hand, when the value of deviation of the pressure average value from the "pressure average initial value" is not equal to or less than the allowable pressure value (S54:No), a zero-point abnormal signal indicating that the pressure sensor zero point is abnormal is transmitted to the higher-level apparatus 23, and the process is finished.

<Operations and Advantages>

In the case where the flow rate verification unit 10A detects flow rate abnormality in any of the mass flow controllers 59, 66A, 66B, 66C, . . . , the flow rate verification failure diagnosis apparatus 8A of the second embodiment diagnoses a failure in the first pressure sensor 44 of the flow rate verification unit 10A and separates the flow rate abnormality caused by a failure in the first pressure sensor 44 from the flow rate abnormality caused by a failure in the mass flow controllers 59, 66A, 66B, 66C, . . . . Therefore, the flow rate verification failure diagnosis apparatus 8A of the second embodiment does not erroneously determine that flow rate abnormality is caused by a failure in the mass flow controllers 59, 66A, 66B, 66C, . . . until it is determined that the flow rate abnormality is caused by a failure in the first pressure sensor 44. Thus, the reliability of the flow rate verification can be improved.

In particular, the flow rate verification failure diagnosis apparatus 8A of the second embodiment diagnoses a failure in the first pressure sensor 44 under the same conditions as those when the flow rate abnormality is detected without detaching the mass flow controllers 59, 66A, 66B, 66C, . . . from the gas units 50 and 60. Therefore, the flow rate verification failure diagnosis apparatus 8A can clearly distinguish between the case where the flow rate abnormality is caused by a failure in the first pressure sensor 44 and the case where the flow rate abnormality is caused by a failure in the mass flow controllers 59, 66A, 66B, 66C, . . . .

In the flow rate verification failure diagnosis apparatus 8A, the flow rate verification failure diagnosis system 26A, and the flow rate verification failure diagnosis method of the second embodiment, in a state where the shutoff valve 41 is closed and the second discharge valve 54 and the measurement open/close valve 56 are opened, a vacuum is formed in the flow rate verification unit 10A, and the measurement open/close valve 56 is closed to hermetically close the flow rate verification unit 10A. After that, the pressure in the flow rate verification unit 10A is measured by the first pressure sensor 44 and monitored (see S51, S52:Yes, S13:Yes, S53, S15, S16:Yes, S31, and S18:Yes in FIG. 9). In the flow rate verification failure diagnosis apparatus 8A, the flow rate verification failure diagnosis system 26A, and the flow rate verification failure diagnosis method, the pressure average value obtained by averaging the pressures measured by the first pressure sensor 44 is compared with the pressure average initial value. When the difference exceeds the allowable value (3 kPa in the present embodiment), a failure is determined such that the zero point in the first pressure sensor 44 shifts (see S32, S54, S55:No, and S36 in FIG. 9). Therefore, the flow rate verification failure diagnosis apparatus 8A, the flow rate verification failure diagnosis system 26A, and the flow rate verification failure diagnosis method of the second embodiment can detect the cause of the flow rate abnormality, which is the zero-point shift of the first pressure sensor 44, separately from the other failures. The failure can be handled more easily.

In the flow rate verification failure diagnosis apparatus 8A, the flow rate verification failure diagnosis system 26A, and the flow rate verification and failure diagnosis method of the second embodiment, in a state where the shutoff valve 41 is closed and the second discharge valve 54 and the measurement open/close valve 56 are opened, a vacuum is formed in the flow rate verification unit 10A. Subsequently, the measurement open/close valve 56 is closed to hermetically close the flow rate verification unit 10A. After that, the pressure in the flow rate verification unit 10A is measured by the first pressure sensor 44 and monitored (see S41, S12:Yes, S13:Yes, S42, S15, S16:Yes, S17, and S18:Yes in FIG. 8). In the flow rate verification failure diagnosis apparatus 8A, the flow rate verification failure diagnosis system 26A, and the flow rate verification failure diagnosis method, the output fluctuation band of the pressure measured by the first pressure sensor 44 and the output fluctuation band initial value of the first pressure sensor 44 are compared. When the difference exceeds the allowable value, occurrence of a failure such that output fluctuation abnormality occurs in the first pressure sensor 44 is determined (see S19, S20, S21:No, and S23 in FIG. 8). Therefore, the flow rate verification failure diagnosis apparatus 8A, the flow rate verification failure diagnosis system 26A, and the flow rate verification failure diagnosis method of the second embodiment can detect the cause of the flow rate abnormality, which is the output fluctuation abnormality in the first pressure sensor 44, separately from the other failures. The failure can be handled more easily.

Third Embodiment

A flow rate verification failure diagnosis apparatus of a third embodiment of the present invention will now be described.

The flow rate verification failure diagnosis apparatus of the third embodiment is applied to the gas supply pipe system 25A shown in FIG. 6 in a manner similar to the second embodiment. In the pressure sensor zero-point shift detecting process of the second embodiment, on the basis of a pressure measurement result of the first pressure sensor 44, a vacuum is formed in the flow rate verification unit 10A, and the abnormality of zero-point shift is detected. However, in the case where abnormality occurs in the first pressure sensor 44, a vacuum may not be formed in the unit 10A. In this case, an error occurs in the pressure measured by the first pressure sensor 44, and accurate zero-point detection cannot be performed.

Consequently, in the flow rate verification failure diagnosis apparatus of the third embodiment, the external I/F 35 of the controller 21A is provided with the second discharge valve 54, the measurement open/close valve 56, the shutoff valve 41, the temperature sensor 43, and the first pressure sensor 44 and, in addition, the second pressure sensor 55 installed downstream of the flow rate verification unit 10A. The controller 21A determines whether there is abnormality in the span of the first pressure sensor 44 installed in the flow rate verification unit 10A using, as a reference, a pressure measured by the second pressure sensor 55 installed on the outside of the flow rate verification unit 10A. In the case where no abnormality in the span is determined, it is determined that the zero point of the first pressure sensor 44 shifts (see S68: Yes, and S69 in FIG. 10, and S5 in FIG. 3). The points different from the second embodiment will be mainly described here. The same reference numerals are designated to the same components as those in the second embodiment, and their description will not be repeated.

Figure 10:
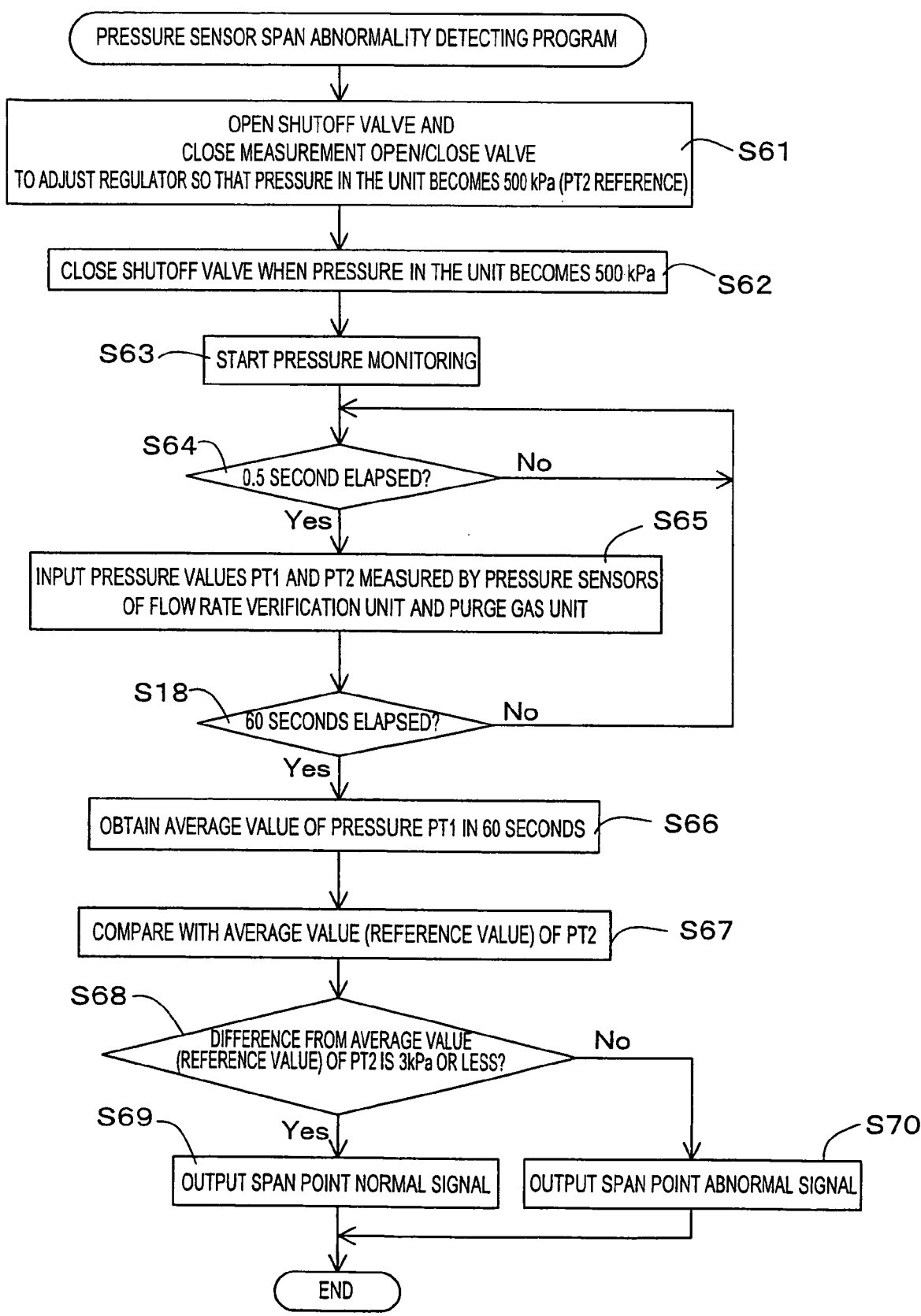
FIG. 10 is a flowchart of a pressure sensor span abnormality detection program executed by a flow rate verification failure diagnosis apparatus of a third embodiment of the present invention.
Figure 11:
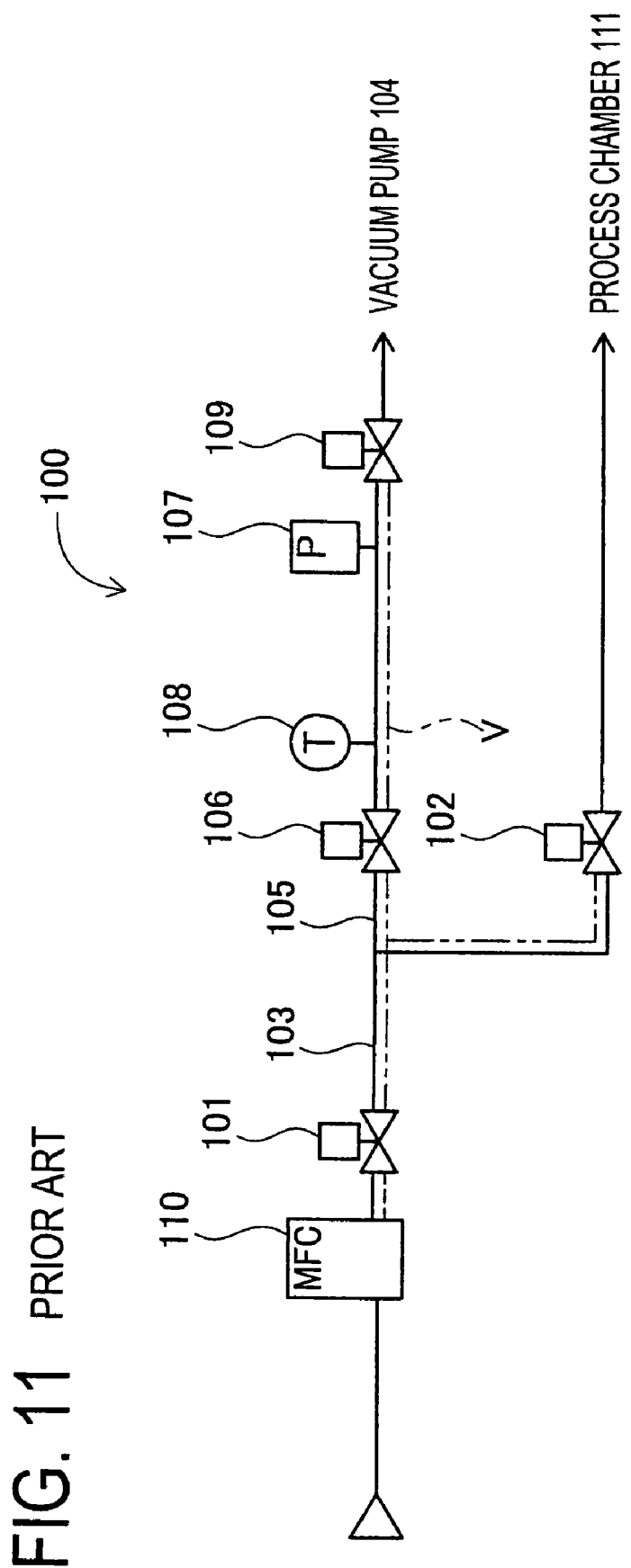
FIG. 11 is a schematic configuration diagram of a conventional flow rate verification system.

FIG. 10 is a flowchart of a pressure sensor span abnormality detection program executed by the flow rate verification failure diagnosis apparatus of the third embodiment of the present invention.

At the time of determining whether the zero point of the first pressure sensor 44 shifts, the higher-level apparatus 23 closes the first and second discharge valves 53 and 54 and the purge gas input valves 68A, 68B, 68C, . . . to interrupt the supply and discharge of the purge gas. The higher-level apparatus 23 closes the input valves 62A, 62B, 62C, . . . and the output valves 65A, 65B, 65C, . . . to interrupt supply of the process gas. In this state, in S61, the flow rate verification failure diagnosis apparatus of the third embodiment opens the shutoff valve 41 and closes the measurement open/close valve 56 to introduce the purge gas into the flow rate verification unit 10A. The flow rate verification unit 10A adjusts the pressure by the regulator 52 of the purge gas unit 50 so that the pressure in the unit 10A becomes 500 kPa.

In S62, when it is detected that the pressure in the flow rate verification unit 10A becomes 500 kPa on the basis of a pressure PT2 measured by the second pressure sensor 55, the controller 21A closes the shutoff valve 41 to fill the flow rate verification unit 10A with purge gas. In S63, pressure monitoring by the first pressure sensor 44 of the flow rate verification unit 10A and the second pressure sensor 55 of the purge gas unit 50 starts. In S64, whether 0.5 second has elapsed since the pressure monitor started or not is determined. In the case where 0.5 second has not elapsed yet since the pressure monitor started (S64:No), the controller 21A waits.

In the case where 0.5 second has elapsed since the pressure monitor started (S64:Yes), in S65, a pressure PT1 measured by the first pressure sensor 44 and a pressure PT2 measured by the second pressure sensor 55 of the purge gas unit 50 are inputted and stored in the RAM 33. In S18, whether seconds have elapsed since the pressure monitor started or not is determined. In the case where 60 seconds have not elapsed yet since the pressure monitor started (S18:No), the program returns to S64. By repeating the processes in S64 to S18, the pressures PT1 and PT2 measured every 0.5 second by the first and second pressure sensors 44 and 55 are accumulated and stored in the RAM 33. After a lapse of 60 seconds since the pressure monitor started (S18:Yes), the program advances to S66 where an average value of the pressures PT1 measured by the first pressure sensor 44 for the period of 60 seconds since the pressure monitor started is calculated.

In S67, the average of the pressure values calculated in S66 is compared with an average value (reference value) of the pressures PT2 measured by the second pressure sensor 55 for the period of 60 seconds since the pressure monitor started. In S68, whether the difference between the average of the pressure values calculated in S66 and the reference value is equal to or less than an allowable pressure value or not is determined. The allowable pressure value is determined in a manner similar to that at the time of pressure rise. In the present embodiment, the allowable pressure value is set to 3 kPa. When the difference between the average of the pressure values calculated in S66 and the reference value is equal to or less than the allowable pressure value (S68:Yes), in S69, a span point normal signal indicating that the span point of the first pressure sensor 44 is normal is transmitted to the higher-level apparatus 23. After that, the process is finished. On the other hand, in the case where the difference between the average of the pressure values calculated in S66 and the reference value is not equal to or less than the allowable pressure value (S68:No), in S70, a span point abnormal signal indicating that the span point of the first pressure sensor 44 is abnormal is transmitted to the higher-level apparatus 23. After that, the process is finished.

In S5 in FIG. 3, when the span point normal signal is received from the controller 21A, the higher-level apparatus 23 determines that the zero point of the first pressure sensor 44 in the flow rate verification unit 10A has shifted, and that the flow rate abnormality is caused by the zero-point shift of the first pressure sensor 44.

On the other hand, in S5 in FIG. 3, when the span point abnormal signal is received from the controller 21A, the higher-level apparatus 23 determines that the zero point of the first pressure sensor 44 in the flow rate verification unit 10A has not shifted, and that the flow rate abnormality is caused by a span error in the first pressure sensor 44 in the flow rate verification unit 10A.

<Operations and Advantages>

In the case where the flow rate verification unit 10A detects flow rate abnormality in any of the mass flow controllers 59, 66A, 66B, 66C, . . . , using the second pressure sensor 55 provided on the outside of the flow rate verification unit 10A as a reference, the flow rate verification failure diagnosis apparatus of the third embodiment diagnoses a failure in the first pressure sensor 44 of the flow rate verification unit 10A and separates the flow rate abnormality caused by a failure in the first pressure sensor 44 from the flow rate abnormality caused by a failure in the mass flow controllers 59, 66A, 66B, 66C, . . . . Therefore, in the flow rate verification failure diagnosis apparatus of the third embodiment, it is not erroneously determined that flow rate abnormality is caused by a failure in the mass flow controllers 59, 66A, 66B, 66C, . . . until it is determined that the flow rate abnormality is caused by a failure in the first pressure sensor 44. Thus, the reliability of the flow rate verification can be improved.

In particular, the flow rate verification failure diagnosis apparatus of the third embodiment diagnoses a failure in the first pressure sensor 44 under the same conditions as those when the flow rate abnormality is detected without detaching the mass flow controllers 59, 66A, 66B, 66C, . . . from the gas units 50 and 60. Therefore, the flow rate verification failure diagnosis apparatus can clearly distinguish between the case where the flow rate abnormality is caused by a failure in the first pressure sensor 44 and the case where the flow rate abnormality is caused by a failure in the mass flow controllers 59, 66A, 66B, 66C, . . . .

In the flow rate verification failure diagnosis apparatus, the flow rate verification failure diagnosis system, and the flow rate verification failure diagnosis method of the third embodiment, in a state where the shutoff valve 41 is opened and the measurement open/close valve 56 is closed, purge gas (gas for measurement) is introduced into the flow rate verification unit 10A. When the second pressure sensor 55 detects that the pressure in the unit 10A reaches a target pressure, the shutoff valve 41 is closed, and purge gas is introduced to a portion between the shutoff valve 41 and the measurement open/close valve 56 (see S61 and S62 in FIG. 10). Subsequently, in the flow rate verification failure diagnosis apparatus, the flow rate verification failure diagnosis system, and the flow rate verification failure diagnosis method, the pressure in portion between the shutoff valve 41 and the measurement open/close valve 56 is measured by the first and second pressure sensors 44 and 55 and monitored (see S63, S64, S65, and S18:Yes in FIG. 10). In the flow rate verification failure diagnosis apparatus, the flow rate verification failure diagnosis system, and the flow rate verification failure diagnosis method, the pressure average value obtained by averaging the pressures PT1 measured by the first pressure sensor 44 in the flow rate verification unit 10A is compared with the pressure average value (reference value) obtained by averaging the pressures PT2 measured by the second pressure sensor 55 provided on the downstream side of the flow rate verification unit 10A. When the difference exceeds the allowable value (3 kPa in the present embodiment), it is determined that the span point in the first pressure sensor 44 shifts (see S66, S67, S68:No, and S70 in FIG. 5). Therefore, the flow rate verification failure diagnosis apparatus, the flow rate verification failure diagnosis system, and the flow rate verification failure diagnosis method of the third embodiment can detect the cause of the flow rate abnormality, which is the span error in the first pressure sensor 44, separately from the other failures. The failure can be handled more easily.

In the flow rate verification failure diagnosis method of the third embodiment, for example, in the case where the flow rate verification unit 10A performs the flow rate verification by the pressure drop method, even when a vacuum cannot be formed in the portion between the shutoff valve 41 and the measurement open/close valve 56, it can be properly detected that the flow rate abnormality is caused by a failure in the first pressure sensor 44.

The present invention may be embodied in other specific forms without departing from the spirit or essential characteristics thereof.

For example, in the above mentioned embodiments, cause of the flow rate abnormality is determined in the order as shown in FIG. 3. However, the order is not limited to the order shown in FIG. 3.

For example, in the above mentioned embodiments, the mass flow controllers 4, 59, and 66 are applied as one example of a flow rate control device. However, devices such as a mass flow manometer may be applied as a flow rate control device.

While the presently preferred embodiments of the present invention have been shown and described, it is to be understood that this disclosure is for the purpose of illustration and that various changes and modifications may be made without departing from the scope of the invention as set forth in the appended claims.

What is claimed is:

1. A flow rate verification failure diagnosis apparatus comprising:
a gas supply pipe system including:
flow rate control devices; and
a flow rate verification unit having a pressure measurement device, the flow rate verification unit detecting flow rate abnormality by measuring a flow rate of fluid in each of the flow rate control devices on the basis of pressure of the fluid measured by the pressure measurement device; and
a failure diagnosis device having a mode to diagnose a failure in the pressure measurement device in a case of the flow rate verification unit detecting the flow rate abnormality;
a gas box for storing the flow rate control devices and the flow rate verification unit;
a gas box temperature measurement device for measuring temperature in the gas box; and
a temperature change failure diagnosis device for determining flow rate abnormality occurring due to temperature change in the gas box in a case where the flow rate verification unit detects the flow rate abnormality in any of the flow rate control devices and where temperature measured by the gas box temperature measurement device changes.

2. The flow rate verification failure diagnosis apparatus according to claim 1, wherein
the failure diagnosis device comprising a zero-point shift detection device for determining a failure that a zero point of the pressure measurement device shifts when a difference between an average value of pressure measured by the pressure measurement device and a reference value exceeds an allowable range.

3. The flow rate verification failure diagnosis apparatus according to claim 2, wherein
the failure diagnosis device comprising an output fluctuation abnormality detection device for determining a failure that output fluctuation abnormality occurs in the pressure measurement device when a difference between an output fluctuation band of pressure measured by the pressure measurement device and an output fluctuation band initial value of the pressure measurement device exceeds another allowable range.

4. The flow rate verification failure diagnosis apparatus according to claim 1, wherein
the failure diagnosis device comprises an output fluctuation abnormality detection device for determining a failure that output fluctuation abnormality occurs in the pressure measurement device when a difference between an output fluctuation band of pressure measured by the pressure measurement device and an output fluctuation band initial value of the pressure measurement device exceeds an allowable range.

5. A flow rate verification failure diagnosis system comprising:
a gas supply pipe system including:
flow rate control devices; and
a flow rate verification unit having a pressure measurement device, the flow rate verification unit detecting flow rate abnormality by measuring a flow rate of fluid in the flow rate control devices on the basis of pressure of the fluid measured by the pressure measurement device;
a flow rate control device failure diagnosis device for determining a failure causing the flow rate abnormality in other devices besides the flow rate control devices when the flow rate verification unit determines a flow rate abnormality in all of the flow rate control devices and a failure causing the flow rate abnormality in a specific one of the flow rate control devices when the flow rate verification unit determines the flow rate abnormality only in the specific flow rate control device;
a gas box for storing the flow rate control devices and the flow rate verification unit;
a gas box temperature measurement device for measuring temperature in the gas box; and
a gas box temperature fluctuation failure diagnosis device for determining the flow rate abnormality caused by temperature changes in the gas box in a case where temperature measured by the gas box temperature measurement device is changed.

6. The flow rate verification failure diagnosis system according to claim 5, further comprising a pressure measurement device failure diagnosis device for diagnosing a failure in the pressure measurement device.

* * * * *